US007961781B2

(12) United States Patent
Telang et al.

(10) Patent No.: US 7,961,781 B2
(45) Date of Patent: Jun. 14, 2011

(54) ELECTRONIC DISPERSION COMPENSATION UTILIZING INTERLEAVED ARCHITECTURE AND CHANNEL IDENTIFICATION FOR ASSISTING TIMING RECOVERY

(75) Inventors: Vivek Telang, Austin, TX (US); Vasudevan Parthasarathy, Irvine, CA (US); Sudeep Bhoja, San Jose, CA (US); Hong Chen, Irvine, CA (US); Afshin Momtaz, Laguna Hills, CA (US); Chung-Jue Chen, Irvine, CA (US); Ali Ghiasi, Cupertino, CA (US); Michael Furlong, Santa Margarita, CA (US); Lorenzo Longo, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 767 days.

(21) Appl. No.: 11/837,278

(22) Filed: Aug. 10, 2007

(65) Prior Publication Data
US 2008/0049847 A1 Feb. 28, 2008

Related U.S. Application Data

(60) Provisional application No. 60/840,123, filed on Aug. 25, 2006.

(51) Int. Cl.
*H03H 7/30* (2006.01)
(52) U.S. Cl. ........................................ 375/229; 375/355
(58) Field of Classification Search .......... 375/229–236, 375/355
See application file for complete search history.

(56) References Cited

U.S. PATENT DOCUMENTS

| | | | | |
|---|---|---|---|---|
| 5,353,312 | A | * | 10/1994 | Cupo et al. ..................... 375/354 |
| 5,604,460 | A | | 2/1997 | Sehrig et al. |
| 5,638,409 | A | | 6/1997 | Awata et al. |
| 5,684,431 | A | | 11/1997 | Gilbert et al. |
| 5,870,042 | A | | 2/1999 | Noda |
| 6,055,119 | A | * | 4/2000 | Lee ................................. 360/51 |
| 6,177,899 | B1 | | 1/2001 | Hsu |
| 6,195,386 | B1 | | 2/2001 | Oh |
| 6,204,784 | B1 | | 3/2001 | Hatfield |
| 6,363,112 | B1 | | 3/2002 | Azadet et al. |
| 6,466,629 | B1 | | 10/2002 | Isaksson et al. |
| 6,522,282 | B1 | | 2/2003 | Elbornsson |

(Continued)

FOREIGN PATENT DOCUMENTS

EP 1006697 A2 7/2000
(Continued)

OTHER PUBLICATIONS

Supplemental Notice of Allowability received for U.S. Appl. No. 11/845,762, mailed on Mar. 24, 2009, 5 pages.
(Continued)

*Primary Examiner* — Kevin Y Kim
(74) *Attorney, Agent, or Firm* — Brake Hughes Bellerman LLP

(57) ABSTRACT

Embodiments include a system for performing dispersion compensation on an electromagnetic signal received over a communication channel, the electromagnetic signal bearing information at a symbol rate. An interleaved analog to digital converter ("ADC") block may be used, wherein the interleaved ADC block may be configured to generate a plurality of digitally sampled signals from the electromagnetic signal. An interleaved equalizer block may be configured to digitally process each of the digitally sampled signals generated by the ADC block to generate a plurality of digitally equalized signals. A multiplexer may be configured to aggregate the digitally equalized signals into a composite output signal.

18 Claims, 17 Drawing Sheets

U.S. PATENT DOCUMENTS

| | | | |
|---|---|---|---|
| 6,570,410 B2 | 5/2003 | Manganaro | |
| 6,603,415 B1 | 8/2003 | Somayajula | |
| 6,653,959 B1 * | 11/2003 | Song | 341/131 |
| 6,653,966 B1 | 11/2003 | van der Goes et al. | |
| 6,707,868 B1 | 3/2004 | Camagna et al. | |
| 6,965,651 B1 | 11/2005 | Chou | |
| 6,982,664 B1 | 1/2006 | Nairn | |
| 7,010,269 B2 | 3/2006 | Meehan et al. | |
| 7,027,503 B2 | 4/2006 | Smee et al. | |
| 7,050,419 B2 | 5/2006 | Azenkot et al. | |
| 7,053,804 B1 | 5/2006 | Nairn | |
| 7,133,657 B2 * | 11/2006 | Kuenen et al. | 455/324 |
| 7,148,828 B2 | 12/2006 | Fernandez et al. | |
| 7,215,274 B2 | 5/2007 | Liu | |
| 7,233,270 B2 | 6/2007 | Lin | |
| 7,260,377 B2 | 8/2007 | Burns et al. | |
| 7,292,101 B2 | 11/2007 | Kocaman et al. | |
| 7,313,198 B2 | 12/2007 | Rahman et al. | |
| 7,324,038 B2 | 1/2008 | van der Goes et al. | |
| 7,355,476 B2 | 4/2008 | Kasha et al. | |
| 7,471,339 B2 | 12/2008 | Smith et al. | |
| 7,525,462 B2 | 4/2009 | Parthasarthy et al. | |
| 7,525,470 B2 | 4/2009 | Parthasarthy et al. | |
| 7,560,986 B2 | 7/2009 | Kocaman | |
| 7,755,426 B2 | 7/2010 | Kocaman et al. | |
| 7,830,987 B2 | 11/2010 | Bhoja et al. | |
| 2001/0016926 A1 | 8/2001 | Riggle | |
| 2001/0043658 A1 | 11/2001 | Voorman et al. | |
| 2002/0122503 A1 | 9/2002 | Agazzi | |
| 2002/0164966 A1 | 11/2002 | Meehan et al. | |
| 2003/0142697 A1 | 7/2003 | Parhi | |
| 2003/0174783 A1 | 9/2003 | Rahman et al. | |
| 2005/0019042 A1 | 1/2005 | Kaneda et al. | |
| 2005/0040891 A1 | 2/2005 | Sobel | |
| 2005/0084028 A1 | 4/2005 | Yu et al. | |
| 2005/0130617 A1 | 6/2005 | Burns et al. | |
| 2005/0270212 A1 | 12/2005 | Smith et al. | |
| 2006/0067699 A1 | 3/2006 | Chandrasekhar | |
| 2007/0024484 A1 | 2/2007 | Liu | |
| 2007/0133719 A1 | 6/2007 | Agazzi et al. | |
| 2008/0048896 A1 | 2/2008 | Parthasarthy et al. | |
| 2008/0048897 A1 | 2/2008 | Parthasarthy et al. | |
| 2008/0049825 A1 | 2/2008 | Chen et al. | |
| 2008/0049847 A1 | 2/2008 | Telang et al. | |
| 2008/0069198 A1 | 3/2008 | Bhoja et al. | |
| 2008/0069199 A1 | 3/2008 | Chen et al. | |
| 2008/0187082 A1 | 8/2008 | Bhoja et al. | |
| 2008/0240325 A1 | 10/2008 | Agazzi et al. | |
| 2008/0258814 A1 | 10/2008 | Kocaman et al. | |
| 2008/0272952 A1 | 11/2008 | Wood | |
| 2009/0310665 A1 * | 12/2009 | Agazzi et al. | 375/229 |

FOREIGN PATENT DOCUMENTS

| | | | |
|---|---|---|---|
| KR | 10-206-0001004 | | 1/2006 |
| WO | 0213424 | A2 | 2/2002 |
| WO | 071616 | A2 | 9/2002 |
| WO | 02071616 | A2 | 9/2002 |

OTHER PUBLICATIONS

Notice of Allowance received for U.S. Appl. No. 11/731,481, mailed on Feb. 10, 2009, 9 pages.

Notice of Allowance received for U.S. Appl. No. 11/845,765, mailed on Dec. 18, 2008, 12 pages.

Notice of Allowance received for U.S. Appl. No. 12/135,720, mailed on Oct. 19, 2009, 12 pages.

Notice of Allowance mailed on Dec. 18, 2008 for U.S. Appl. No. 11/845,765.

Office Action for U.S. Appl. No. 12/135,720, mailed on Mar. 19, 2009.

Koc, Ut-Va, Adaptive Electronic Dispersion Compensator for Chromatic and Polarization-Mode Dispersions in Optical Communications Systems, Bell Labs, Lucent Technologies, USA, Apr. 1, 2004; EURASIP Journal on Applied Signal Processing 2005:10, 1584-1592; 2005 Hindlaw Publishing Corporation.

Nikolic, Borivoje, Advanced Topics in Circuit Design: High-Speed Electrical Interfaces, EE209C-Spring 2004; Lecture 16: Components, Decision Feedback Equalizers, pp. 1-19, Mar. 11, 2004.

Stojanovic, Vladimir, et al., Adaptive Equalizer and Data Recovery in a Dual-Mode (PAM2/4) Serial Link Transceiver, Rambus, Inc., Los Altos CA 94022, USA; Department of Electrical Engineering, Stanford University, CA 94305, USA, pp. 1-4.

Mueller, Kurt H., Timing Recovery in Digital Synchronous Data Receivers, IEEE Transactions on Communications, vol. Com-24, No. 5., pp. 516-531.

Stojanovic, Vladimir et al., "Adaptive Equalizer and Data Recovery in a Dual-Mode (PAM2/4) Serial Link Transceiver", Rambus, Inc., Los Altos CA 94022, USA; Department of Electrical Engineering, Stanford University, CA 94305, USA, (2004), pp. 1-4.

Koc, Ut-Va "Adaptive Electronic Dispersion Compensator for Chromatic and Polarization-Mode Dispersions in Optical Communications Systems", Bell Labs, Lucent Technologies, USA, Apr. 1, 2004; EURASIP Journal on Applied Signal Processing 2005:10, 1584-1592; 2005 Hindlaw Publishing Corporation, (2005).

Nikolic, Borivoje "Advanced Topics in Circuit Design: High-Speed Electrical Interfaces", EE209C-Spring 2004; Lecture 16: Components, Decision Feedback Equalizers, (Mar. 11, 2004), pp. 1-19.

Mueller, Kurt H., "Timing Recovery in Digital Synchronous Data Receivers", IEEE Transactions on Communications, vol. Com-24, No. 5, (May 1976), pp. 516-531.

Notice of Allowance from U.S. Appl. No. 11/845,765 dated Oct. 10, 2008.

European Search report from U.S. Appl. No. 11/837,301 dated Dec. 6, 2007.

European Search report from U.S. Appl. No. 11/837,278 dated Dec. 6, 2007.

Notice of Allowance from U.S. Appl. No. 11/845,762 mailed Aug. 11, 2008.

U.S. Appl. No. 11/837,301, Notice of Allowance mailed Apr. 14, 2010, 32 pages.

U.S. Appl. No. 11/845,777, Non-Final Office Action mailed Jun. 21, 2010, 25 pages.

Bergmans, J W., et al., "Dual Decision Feedback Equalizer", vol. 45, IEEE,(1997), pp. 514-518.

U.S. Appl. No. 11/845,779 Non-Final Office Action mailed Jul. 7, 2010, 24 pages.

U.S. Appl. No. 11/845,781 Non-Final Office Action mailed Jul. 13, 2010, 30 pages.

Office Action for U.S. Appl. No. 11/845,781, mailed on Feb. 8, 2011, 20 pages.

Final Office Action for U.S. Appl. No. 11/845,779, mailed on Jan. 5, 2011, 24 pages.

Notice of Allowance for U.S. Appl. No. 11/845,762, mailed on Dec. 3, 2008, 14 pages.

Office Action for U.S. Appl. No. 11/731,481, mailed on Aug. 20, 2008, 6 pages.

Notice of Allowance for U.S. Appl. No. 11/837,301, mailed on Jul. 28, 2010, 11 pages.

Notice of Allowance for U.S. Appl. No. 12/135,720, mailed on Feb. 23, 2010, 10 pages.

Sanjay, K. (1991). Techniques for High-Speed Implementation of Nonlinear Cancellation. IEEE Journal on Selected Areas in Communications, vol. 9 No. 5, pp. 711-717.

* cited by examiner

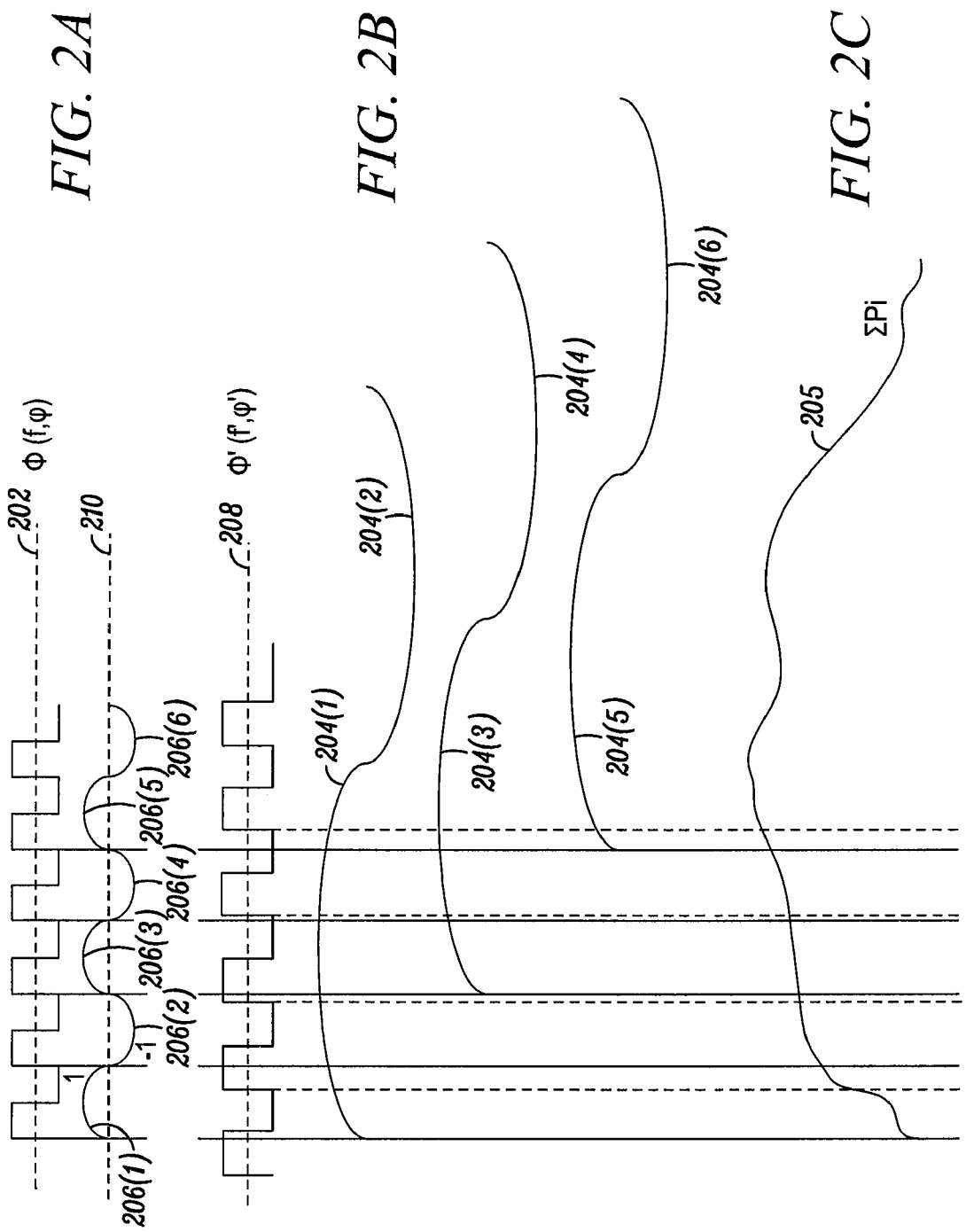

ELECTRONIC DISPERSION COMPENSATION UTILIZING INTERLEAVED ARCHITECTURE AND CHANNEL IDENTIFICATION FOR ASSISTING TIMING RECOVERY

CROSS-REFERENCE TO RELATED APPLICATION

This application claims priority under 35 U.S.C. §119(e) to Provisional Patent Application 60/840,123, filed Aug. 25, 2006, and titled "DIGITAL ELECTRONIC DISPERSION COMPENSATION FOR MULTI-MODE FIBER," which is incorporated herein by reference in its entirety.

TECHNICAL FIELD

This description relates to digital integrated circuits and signal processing. In particular, this description relates to performing electronic dispersion compensation, employing an interleaved architecture and utilizing channel identification information for performing timing recovery.

BACKGROUND

A telecommunication system may include a transmitter for encoding information to be transmitted as an electromagnetic wave, a transmission medium which provides a conduit for the transmission of the electromagnetic wave and a receiver for receiving and processing the information bearing electromagnetic wave. A telecommunication system may utilize a waveguide as a transmission medium. A waveguide is a structure that guides or constrains the propagation of electromagnetic radiation. A waveguide may comprise a system of material boundaries in the form of a solid dielectric. In telecommunications, optical fibers are often utilized as waveguides.

It is desirable to increase the bandwidth or transmission rate of a telecommunication system for several reasons. First, greater bandwidth is required to support modern telecommunication applications such as that employed in data centers, or for live video and audio, multimedia and other bandwidth intensive applications. In addition, for efficiency and cost reasons it is desirable to increase the bandwidth of telecommunication systems. Therefore, it is important to address the physical limitations of waveguides for transmitting high bandwidth electromagnetic signals.

Dispersion is a significant physical phenomenon limiting the ability to successfully transmit and recover an information bearing electromagnetic wave over a communication channel. The phase velocity of any spectral component within a transmission medium will depend upon the index of refraction for the physical medium. Typically, the index of refraction of a transmission medium will be frequency dependent. Waveguide dispersion occurs when the speed of a wave in a waveguide such as optical fiber depends upon its frequency. The transverse modes for waves confined with a waveguide generally have different speeds depending upon the frequency. A similar phenomenon is modal dispersion caused by a waveguide having multiple modes at a given frequency, each of which propagates at a different speed.

Waveguide dispersion leads to signal degradation in telecommunication systems because the varying delay in arrival time between different components of a signal effectively degrades the pulse characteristic of pulses transmitted through the waveguide. This phenomenon is often referred to as intersymbol interference ("ISI"). Adjacent symbols represented as pulses effectively "run into" one another, and energy may exist at a particular sample instant of one symbol that actually includes energy associated with an adjacent symbol Thus, it is necessary to correct for error sources such as dispersion and associated ISI that may be introduced in a received signal transmitted over a communication channel. Typically, a receiver will be equipped with a signal processing system to correct for dispersion effects introduced by the communication channel. These signal processing systems often analyze statistical properties of the communication channel in order to cancel the ISI. The signal processing system typically utilizes one or more equalizers to perform these corrections. One type of equalizer often used is a feed forward equalizer ("FFE"), which attempts to correct for pre-cursor ISI (in which a current symbol is affected by a following symbol). Often an FFE may be combined with a decision feedback equalizer ("DFE"), which attempts to correct for post-cursor ISI (in which a current symbol is affected by a preceding symbol).

There are a number of technical challenges that may arise in building signal processing systems to correct for dispersion and ISI, which become particularly acute in communication systems employing a high baud rate or symbol rate. First, it is desirable to perform signal processing operations in the digital domain as it is often easier to achieve a higher SNR than an equivalent analog system. Second, digital systems offer the advantage of significantly lower complexity in signal layout and design and the opportunity to easily modify the signal processing routines employed.

A digital signal processing system necessitates a conversion of a received analog signal into a digital format. In general, it may be difficult and expensive to build a serial ADC to operate at baud rates in excess of 1.5-2 GHz. This is problematic because it is often desirable to build communication systems that operate around the order of at least 10 GHz. Similar issues exist for designing and building equalizers that may operate at high data rates.

A second technical issue relates to the time varying nature of communication channels, which impacts the performance of timing recovery operations at a receiver. A transmitter will typically include a clock, which is used to encode a data signal onto a carrier signal for transmission over the channel. The transmitter clock will determine the rate at which symbols are provided over the communication channel.

The receiver will typically also require a clock, which ideally should be phase locked to the transmitter clock in order to accurately recover the symbols transmitted by the transmitter over the communication channel. However, the transmitter and receiver clocks typically will experience a drift with respect to one another resulting in a frequency offset between the two. The phase being the integral of the frequency, will therefore suffer an offset between the transmitter and receiver clocks. Thus, receivers in communication systems typically include a timing recovery circuit to attempt to synchronize the transmitter clock with the receiver clock.

Digital communication systems may employ a method referred to as baud rate or symbol rate sampling, in which the received signal is sampled at the baud rate. Because the entire analog signal need not be recovered in a communication system, it is not necessary to sample at the Nyquist rate. However, baud rate sampling imposes significant constraints on the accuracy of the timing recovery operations performed at the receiver in order that the receiver samples a valid and stable signal.

As noted above, communication systems require a physical medium for the transmission of communication signals. The nature of the physical medium underlying the communication system may often be time varying. Typically this time dependence will be on a time scale relatively long compared with the baud rate. In the case where the communication channel may be approximated by its first order behavior, higher order effects are small, the channel characteristic is time invariant and initial conditions are known, the effect of the channel on a transmitted signal may be characterized by a impulse response or Green's function, which describes the response of the channel to an impulse signal. In conventional timing recovery systems utilizing conventional algorithms, the time varying nature of the channel characteristic may not be accounted for, reducing the ability of the signal processing system to perform accurate baud rate sampling and thereby effectively cancel the undesirable ISI effects.

SUMMARY

According to one general aspect, a system may be implemented for performing dispersion compensation on an electromagnetic signal received over a communication channel, the electromagnetic signal bearing information at a symbol rate. An interleaved analog to digital converter ("ADC") block may be used, wherein the interleaved ADC block may be configured to generate a plurality of digitally sampled signals from the electromagnetic signal. An interleaved equalizer block may be configured to digitally process each of the digitally sampled signals generated by the ADC block to generate a plurality of digitally equalized signals. A multiplexer may be configured to aggregate the digitally equalized signals into a composite output signal.

According to another general aspect, a method for performing dispersion compensation on an electromagnetic signal received over a communication channel, the electromagnetic signal bearing information at a symbol rate, may include receiving an electromagnetic signal bearing information at a symbol rate, updating a desired sampling phase of an interleaved analog digital converter ("ADC"), performing variable gain amplification on the electromagnetic signal, performing interleaved analog to digital conversion on the electromagnetic signal to generate a plurality of interleaved digital signals, performing equalization on each of the plurality of interleaved digital signals to generate a plurality of decision signals, and combining the plurality of decision signals to generate a composite data signal.

According to another general aspect, a method for performing timing recovery for sampling a signal transmitted over a communication channel at an inherent symbol rate may include computing a plurality of estimated channel impulse response signals, each of the plurality of estimated channel impulse response signals having a particular phase, periodically determining a best estimated channel response signal from the plurality of estimated channel response signals wherein the best estimated channel response signal describes the impulse response of the communication channel that is most suitable for use by the timing recovery algorithm, and adjusting a timing recovery algorithm based upon the best estimated channel response signal.

The details of one or more implementations are set forth in the accompanying drawings and the description below. Other features will be apparent from the description and drawings, and from the claims.

BRIEF DESCRIPTION OF THE DRAWINGS

FIGS. 2a-2c are timing diagrams illustrating effects of dispersion on an electromagnetic signal transmitted over a communication channel.

DETAILED DESCRIPTION

Figure 1:
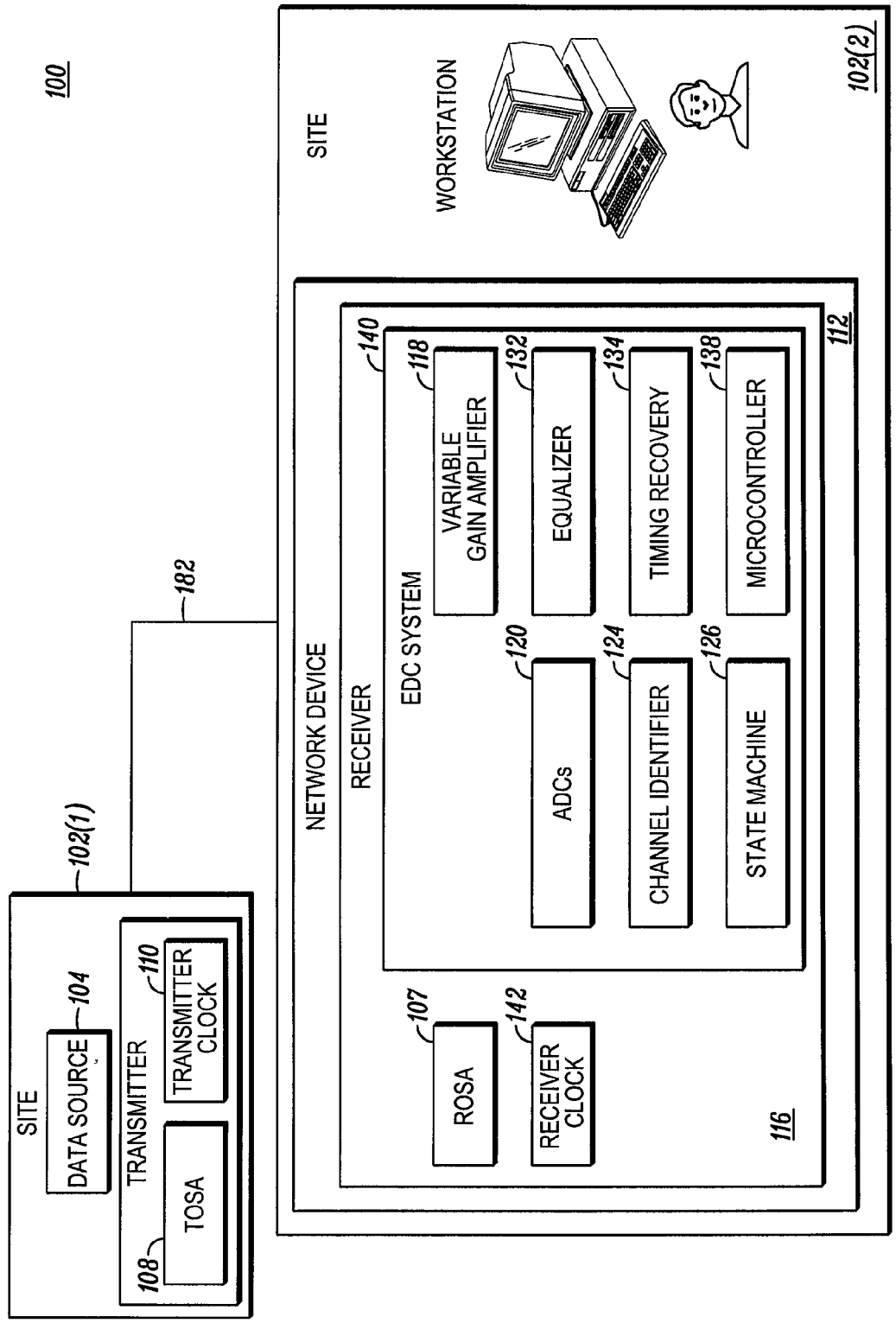
FIG. 1 is a block diagram of a telecommunication system.

FIG. 1 is a block diagram of a telecommunication system 100. The communication system 100 may include any number of sites 102 among which information may be exchanged over any number of communication channels 182. FIG. 1 illustrates two sites 102(1), 102(2), one of which includes a transmitter 108 and functions as a transmission site and the other includes a receiver 116 and functions as a receiver site. This is merely exemplary and it will be understood that a communication system may include any number of sites 102, each of which may provide solely transmission capabilities, solely receiver capabilities or a combination of both transmission and receiver capabilities.

The sites 102(1), 102(2) within the telecommunication system 100, may be, for example, data centers. Or, each site 102 may be a particular structure within a data center such as a data archival system or mass storage device (e.g., a disk storage array), a server or other front-end system. In a data center application, the access and transmission of large quantities of data at high data rates may be particularly important.

Each transmission site 102(1) may include a data source 104, which may be any system for archiving or generating data that is to be transmitted to a receiver site 102(2). Information to be transmitted between the transmission site 102(1) and the receiver site 102(2) may include any type of data such as multimedia information including audio and visual information, text information and may be stored in any appropriate format. The data source 104 may archive data for transmission from the transmission site 102(1) to the receiver site 102(2). Or, the data source 104 may provide real-time or near real-time data for transmission. For example, the data source 104 may be a multimedia device such as a video camera or microphone, which respectively generates video and audio signals. Or, the data source 104 may be an archived multimedia file such as an MPEG file. The data source 104 may include any combination analog and digital information. The data source 104 may include data stored in any type of format including raw data or compressed data.

The transmission site 102(1) may transmit information from the data source 104 to the receiver site 102(2) via the communication channel 182 using electromagnetic signals. The electromagnetic signals transmitted over the communication channel 182 may utilize optical wavelengths or other wavelengths necessary to achieve a desired symbol rate. Thus, the communication channel 182 may be, for example, a fiber optic cable or other physical medium suitable for the transmission of optical wavelength electromagnetic signals. According to one embodiment, the transmission channel 182 may be multi-mode fiber optic cable over which a bit rate of 10 gigabits-per-second ("gbps") is achieved between the transmission site 102(1) and the receiver site 102(2). In a more specific example embodiment, the bit rate may be 10.3125 gbps.

The transmission site 102 may also include a transmitter 108. The transmitter 108 may further include a TOSA 106 ("Transmitter Optical Sub Assembly"), which provides an interface to the optical physical layer (e.g., an optical communication channel). The TOSA 106 may include a laser. In particular, the TOSA 106 may modulate an electromagnetic carrier signal generated by a laser (not shown) using the information provided by the data source 104 and provide this modulated signal to the communication channel 182. As the transmission site 102(1) and receiver site 102(2) may exchange digital information, the TOSA 106 may perform digital modulation of an optical carrier signal. Thus, the TOSA 106 may provide a plurality of electromagnetic signals for transmission over the communication channel 182, which correspond to data provided by the data source 104.

In the case of digital communications between the transmission site 102(1) and the receiver site 102(2), the data source 104 may provide a plurality of numbers representing information to be transmitted between the transmission site 102(1) and the receiver site 116. These numbers may be represented in binary or base 2 as a stream of bits (0 or 1). For each bit to be transmitted, the transmitter 108 may generate a first pulse electromagnetic signal to represent a digital 1 and a second pulse electromagnetic signal to represent a digital 0.

The transmitter 108 may also be equipped with a transmit clock 110, which controls a symbol rate by which the transmitter 108 transmits information over the communication channel 182. According to one embodiment, the transmit clock 110 may operate at 10 Gbps.

The receiver site 102(2) may include a network device 112 coupled to the communication channel 182, which provides a system for receiving and processing a signal transmitted by the transmission site 102(1) over the communication channel 182. In particular, the network device 112 may include a receiver 116, which includes various functional blocks for receiving and processing signals transmitted by the transmission site 102(1) over the communication channel 182.

The receiver 116 may include a ROSA ("Receiver Optical Sub Assembly"). The ROSA may include a photoelectric diode (not shown) which converts a light signal into an electronic signal. In particular, the photoelectric diode may convert a light signal into a current. A transimpedance amplifier in the ROSA (not shown) may further convert the current into a voltage, which can be further processed. The receiver 116 may include a receiver clock 142 that is designed to operate at the same frequency as the transmitter clock 110. Typically, however, the receiver clock 142 will not be perfectly synchronized with the transmitter clock 110 (i.e., there will be a drift or phase offset), which must be corrected for by the receiver. In order to correct for drift between the transmitter clock 110 and receiver clock 142, the receiver 116 may include a timing recovery block 134.

The receiver 116 may further include a variable gain amplifier ("VGA"), analog to digital converters ("ADCs") 120, an equalizer block 132, a channel identifier block 124, a timing recovery block 134, a state machine 126 and a microcontroller 138. The overall operations of the receiver 116 may be controlled by a microcontroller 138, which may coordinate the interactions between various functional blocks on the receiver 116. The state machine 126 may control startup and convergence activities of the receiver. Further example aspects of the EDC system 140, including example operations of the components just mentioned, are provided in more detail, herein.

FIGS. 2a-2c illustrate the effects of dispersion on an electromagnetic signal transmitted over a communication channel on a physical medium such as, for example, a multi-mode fiber optic cable. FIG. 2a illustrates an idealized pulse train comprising a plurality of pulses 206(1)-206(6). Each pulse may be sequenced to a transmitter clock signal 202 characterized by a frequency and phase ($\phi(f,\phi)$). As shown in FIG. 2a, each pulse may correspond to a +1 or a −1 depending upon whether the pulse is positive or negative. Thus, pulses 206(1), 206(3) and 206(5) correspond to a +1, while pulses 206(2), 206(4) and 206(6) correspond to a −1. The +1/−1 pulses may respectively be translated to a 0 or 1 bit at a receiver.

In the ideal scenario shown in FIG. 2a, a receiver clock (not shown in FIGS. 2a-2c) that tracks the transmitter clock signal 202 perfectly in frequency and phase could be implemented at a receiver. In addition, under this ideal scenario, the pulse train 210 generated at a receiver could be transmitted without any signal distortion or degradation to a receiver. The receiver may utilize the receiver clock signal 208 to clock the sampling of a received signal from a transmitter. In particular, the receiver may perform baud rate sampling of the received signal in order to recover the bits encoded at the transmitter.

These ideal conditions, however, are not attainable in practice. FIG. 2b illustrates certain non-idealities that may occur in transmission of electromagnetic signals between a transmitter and a receiver. In particular, FIG. 2b shows a receiver clock signal 208 characterized by a frequency and phase $\phi'(f',\phi')$. The receiver clock signal 208 may have a phase offset, and a frequency offset with respect to the transmitter clock signal 210. This frequency and associated phase offset may occur due to drift between the two clocks.

A second condition limiting the operation of a digital communication system relates to non-idealities of the transmission medium itself including dispersion effects and associated intersymbol interference. FIG. 2b also shows pulse characteristics for a plurality of pulses that have been transmitted to a receiver through a communication channel such as a fiber optic cable. In particular, received pulses 204(1)-204(6) may correspond respectively to transmitted pulses 206(1)-206(6). Each of the transmitted pulses 206(1)-206(6) undergo dispersion due to the characteristics of the communication channel. In particular, the index of refraction of the communication channel may be frequency dependent, resulting in the propagation of various frequency components of each pulse at different velocities. In the case where the communication channel 182 is a multi-mode fiber, dispersion of transmitted pulses may occur. As shown in FIG. 2b, the received pulses 204(1)-204(6) may be spread or smeared in time.

FIG. 2c shows a composite signal of the linear superposition of the pulses 204(1)-204(6). This composite signal may represent the actual communication signal received by the receiver. The characteristic of the transmitted pulse train 210 communication signal received by a receiver. The identity of each individual pulse signal (e.g., 206(1)-206(6)) may be distorted due to this linear superposition. This phenomenon is commonly referred to as intersymbol interference ("ISI"). In order to recover the transmitted signal and/or perform effective baud rate sampling, the ISI introduced by a communication channel must be significantly minimized.

Figure 3A:
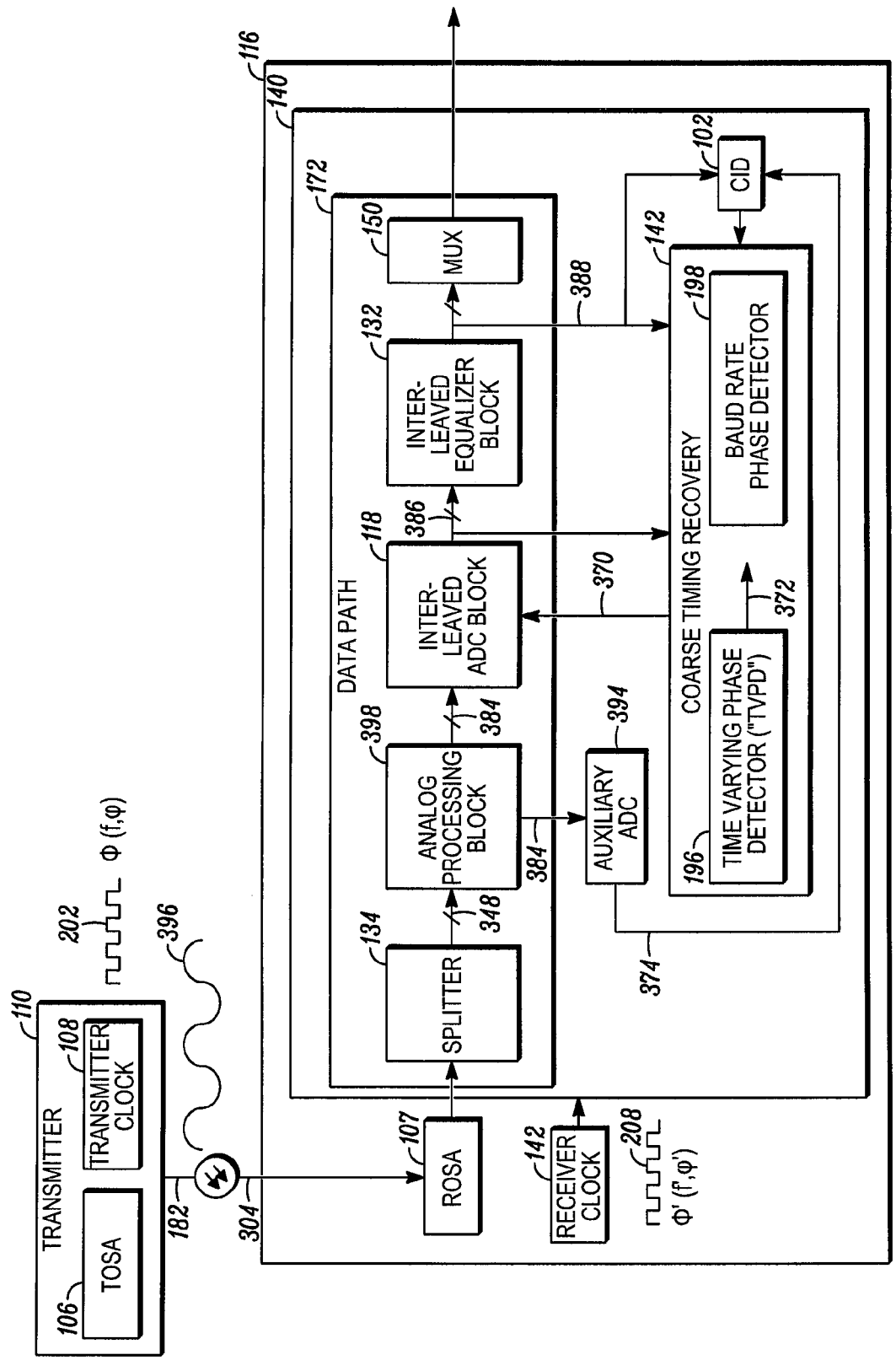
FIG. 3a is a block diagram of a signal processing system for correcting signal distortion in a signal received at a receiver in a communication system.

FIG. 3a is a block diagram of a signal processing system for correcting signal distortion such as waveguide dispersion and associated ISI in a signal received at a receiver in a communication system. A pulse signal 206 is generated at a transmitter 108 encoding data at a baud rate as a function of a transmitter clock 110, which generates a transmitter clock signal 202. The pulse signal is provided to a communication channel via a TOSA 106 at the transmitter 108. The communication channel may be implemented using a multi-mode fiber optic cable.

A transmitter 108 may generate an information bearing signal 396 comprising a plurality of pulses synchronized to a transmitter clock 110, which generates a transmitter clock signal 202. The transmitter clock signal 202 may define a baud rate or symbol rate defining a number of distinct signal changes provided to the communication channel 182 per second. The transmitter clock may encode data at any baud rate. For example, according to one embodiment the baud rate is 10 Gbps.

A TOSA 106 at the transmitter 108 may cause the transmission of the information bearing signal 396 over a communication channel 182, which may be a multi-mode fiber optic communication channel. The information bearing signal 396 may undergo various transformations and/or distortions due to a channel characteristic of the communication channel 182. These distortions and transformations may cause the received signal 304 received at a ROSA 107 to be been significantly altered from the information bearing signal 396 generated at the transmitter 108. These distortions may include among other things ISI and dispersion. The channel characteristic may be characterized by an impulse response of the communication channel 182. These distortions may result in significant difficulties in recovering the information originally encoded in the information bearing signal 396.

The received signal 304 may be provided to a signal processing system 140 in order to compensate for the signal distortions introduced by the communication channel 182. In particular, the signal processing system 140 may perform signal conditioning on the received signal 304 to correct for distortions introduced by the communication channel 182. In general, the signal processing system 140 may perform processing on the received signal 304 in both the analog and digital domains. In order to perform digital processing, the signal processing system 140 may perform analog to digital conversion of a signal derived from the received signal 304 (described below).

Because the information bearing signal 396 may encode data at a high baud rate, the signal processing system 140 may include one or more interleaved structures that may individually operate at a clock rate lower than the baud rate. This may be useful to perform processing in the digital domain. Thus, as shown in FIG. 3a, the signal processing system 140 may include an interleaved ADC block 118 and an interleaved equalizer block 132. As described in more detail below, the interleaved ADC block 118 may include a plurality of ADCs, each operating at a lower clock rate than the baud rate. Similarly, the interleaved equalizer block 132 may include a plurality of equalizer structures each operating at a lower clock rate than the baud rate. The interleaved ADC block 118 and interleaved equalizer block 132 may operate at the same clock rate or different clock rates, with respect to one another.

The interleaved ADC block 118 may utilize baud rate sampling so that the combined operation of the plurality of ADC's comprising the interleaved ADC block 118 may effectively sample the received signal 396 at the baud rate. The receiver may include a receiver clock 142, which generates a receiver clock signal 208. Ideally the receiver clock 142 would be precisely locked with the transmitter clock 110 in frequency to allow for precision sampling of the received signal 396 at the baud rate. However, in practice the receiver clock 142 will typically drift in frequency with respect to the transmitter clock 110, resulting in a phase offset between the transmitter clock 110 and receiver clock 142. In order to compensate for this frequency drift, the signal processing system 140 may include a baud rate phase detector 198. The baud rate phase detector 198 may operate to recover timing information relating to the received signal 304. The timing information may be utilized to enforce the condition that each sampling instant at which the interleaved ADC samples the received signal 304 corresponds to a valid and stable symbol condition as it was encoded at the transmitter 108. The timing recovery operation performed by the baud rate phase detector 198 facilitates the use of baud rate sampling by the interleaved ADC block 118 and helps to ensure the samples obtained at the baud rate correspond to valid symbols. According to one embodiment, the baud rate phase detector 198 may utilize an algorithm derived from the Mueller-Muller algorithm. The receiver clock signal 208 may be utilized by the interleaved ADC block 118 to trigger a sampling operation.

As just noted, the baud rate phase detector 198 may perform a variant of the Mueller-Muller algorithm in order to perform timing recovery operations. In order to carry out this algorithm, the baud rate phase detector may assume that the communication channel 182 has a particular channel characteristic, which may be expressed as an impulse response for the communication channel 182. However, due to fluctuating physical conditions, the channel characteristic of the communication channel 182 may, in fact, vary in time. Typically, the time variation of the channel characteristic may vary at a rate significantly slower than the baud rate. For example, in the case of a multi-mode fiber, the time variation of the channel characteristic may occur as a result of a physical movement or vibration of the fiber, which may occur relatively infrequently with respect to the baud rate.

In order to account for the time varying nature of the channel characteristic, the signal processing system 140 may include a time varying phase detector ("TVPD") 196. The TVPD 196 may periodically determine a channel characteristic of the time varying communication channel 182. The channel characteristic may be an estimated impulse response of the communication channel 182. As described below, the TVPD 196, or related circuitry within the CID block 102, may compute the estimated impulse response of the communication channel 182 for each of a plurality of sampling phases. These plurality of sampling phases may then be used to provide estimates of the impulse response that are over sampled compared to the baud rate. The TVPD 196, or related circuitry within the CID block 102, may periodically compute an optimum phase among the plurality of phases using a metric. The TVPD 196, or related circuitry within the CID block 102, may then compute timing information data 372 which it may provide to a phase locked loop (PLL), (not shown in FIG. 3*a*) used to control a sampling operation of the interleaved ADC block 118.

Referring to FIG. 3*a*, the received signal 304 after being received by a ROSA 107 on the receiver 116 may be provided to a data path 172 comprising a splitter 134, an analog processing block 398, an interleaved ADC block 118, an interleaved equalizer block 132 and a multiplexer ("MUX") 150. The splitter 134 may split the received signal 304 into a parallel analog signal 348 comprising a plurality of analog signals. The parallel analog signal 348 may then be provided to an analog processing block 398. The analog processing block 398 may perform signal conditioning on the parallel analog signal 348 generating a processed analog signal 384. The nature of the signal conditioning performed by the analog processing block 398 will be described in more detail below. In general, however, signal conditioning may include gain adjustment or analog filtering. The analog processing block 398 may then generate a processed analog signal 384, which may be provided to an interleaved ADC block 118. The interleaved ADC block 118 may effectively perform analog to digital conversion of the processed analog signal 384 at the baud rate. As described in more detail below, the interleaved ADC block 118 may comprise a plurality of ADCs, each operating at a lower clock rate than the baud rate such that the combined operation of the plurality of ADCs is to sample the processed analog signal 384 at the baud rate.

The interleaved ADC block 118 may output a digital signal 386, which may then be provided to an interleaved equalizer block 132. As described in more detail below the digital signal 386 provided by the interleaved ADC block 118 to the interleaved equalizer block 118 may comprise a plurality of digital signals each corresponding to a separate ADC on the interleaved ADC block 118. The interleaved equalizer block 132 may perform digital equalization on the digital signal 386. As described below, the equalization performed by the interleaved equalizer block 132 may correct for dispersion and ISI introduced by the communication channel 182. The interleaved equalizer block 132 may comprise any combination of a feed forward equalizer ("FFE"), decision feedback equalizer ("DFE") and sequence DFE as described below.

The interleaved equalizer block 132 may generate a decision signal 388, which may be provided to a multiplexer ("MUX") 150. The MUX 150 may generate a multiplexed output, as shown.

The decision signal 388 may also be provided to the TVPD 196. The processed analog signal 384 may be provided to an auxiliary ADC 394 which may sample the processed analog signal 384 and generate a digital signal 374 for processing by the TVPD 196 in conjunction with the decision signal 388. The auxiliary ADC 394 may operate at a sampling rate significantly lower than the baud rate. According to one embodiment, the auxiliary ADC may operate at 10 MHz.

As described below, the CID block 102 may compute the estimated impulse response of the communication channel 182 for each of a plurality of sampling phases, and may periodically compute an optimum phase among the plurality of phases using a metric. The TVPD 196 may thus determine a regenerated or reference waveform using the calculated optimum phase information, so that the timing recovery may be performed (e.g., by a PLL 804, as shown in FIG. 7*b*) based on an error calculation performed between this regenerated or reference waveform and the actual output 386 of the interleaved ADC block 118.

Figure 3B:
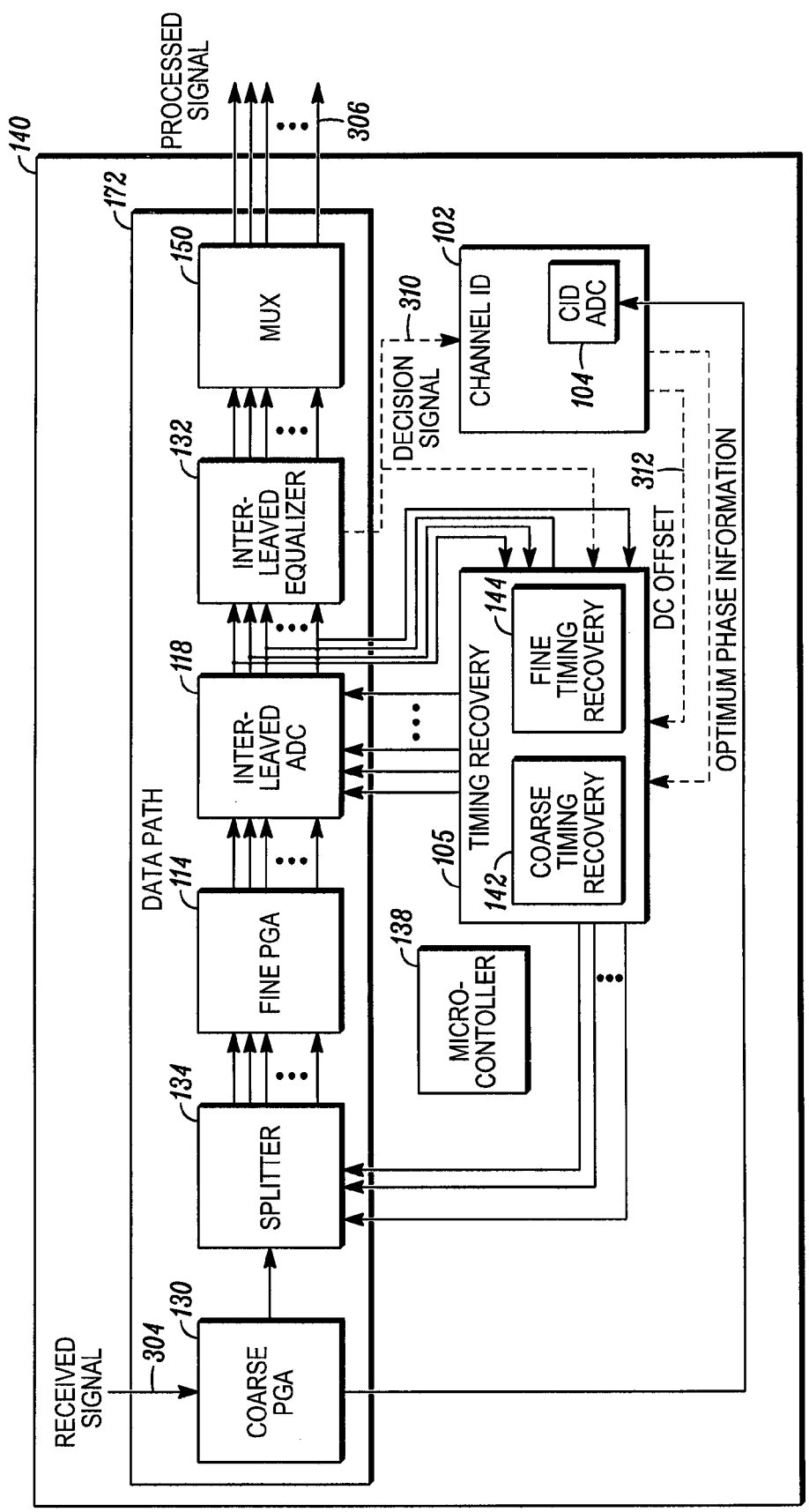
FIG. 3b depicts a detailed view of a signal processing system.

FIG. 3*b* depicts a more detailed view of the signal processing system 140. As shown in FIG. 3*b*, the signal processing system 140 may include the microcontroller 138, which may orchestrate the operation and interoperation of the various components comprising the signal processing system 140. For example, the microcontroller 138 may trigger various functional blocks on the signal processing system 140 at various points in time.

In order to handle high data rates, the signal processing system 140 may utilize one or more interleaved components. An interleaved architecture may allow a particular component to operate at a clock rate lower than symbol rate. For example, to the extent that the signal processing system may perform a portion of the signal processing in the digital domain, the signal processing system 140 may include an interleaved analog to digital converter ("ADC") block 118. According to one embodiment, the signal processing system 140 may utilize baud rate sampling in which the received signal 304 is sampled at the symbol rate. Thus, for example, if the symbol rate is 10 Gbps, the signal processing system 140 may utilize an interleaved ADC block 118 employing a parallel array of ADCs (not shown in FIG. 3) each operating at a sampling rate of 1.25 Gbps to achieve the desired baud rate sampling of 10 Gbps. The bandwidth of each of the parallel array of ADCs may be set, for example, to approximately 5 GHz.

In addition, the signal processing system 140 may include an interleaved equalizer block 132 to correct for various signal distortions including dispersion and ISI. The interleaved equalizer block 132 and interleaved ADC 118 may both utilize the same or a different number of parallel substructures. For example, according to one embodiment, the interleaved ADC 118 includes eight parallel ADCs each operating at a sampling rate of approximately 1.25 GHz. The interleaved equalizer block 132 may include a parallel array of 16 equalizer slices each operating at a clock rate of approximately 625 MHz. In general, the interleaved ADC block 118 and interleaved equalizer block 132 may each respectively utilize any number of parallel substructures and may individually operate at any suitable clock rate. Further, the above values are merely for the sake of example, and may be adjusted as needed, e.g., if an actual data rate varies from the 10 Gbps example (e.g., is 10.3125 Gbps or some other desired value).

The signal processing system 140 may also include a timing recovery block 105 to perform symbol synchronization or timing recovery. A receiver clock or clocks (not shown in FIG. 3*b*) may be continuously adjusted in its frequency and phase to optimize the sampling instants of the received signal 304 and to compensate for frequency drifts between oscillators used in the transmitter clock and receiver clock circuits (not shown in FIG. 3*b*). The timing recovery block 105 may provide timing information to the interleaved ADC block 118 in order to ensure that the interleaved ADC block 118 performs its sampling operations precisely. In particular, for example, if the signal processing system 140 performs baud rate sampling, the timing recovery block 105 causes the interleaved ADC block 118 to perform sampling at the symbol rate.

More specifically, the timing recovery block 105 may output timing information to the splitter 134, in order to cause the splitter 134 to split the incoming signal from the coarse PGA 130 into a number of signals that are appropriately spaced from one another (e.g., are 100 ps apart). Further, the timing recovery block 105 may output to the interleaved ADC block 118 by way of a plurality of interpolators, so that the interleaved ADCs may sample the baud in very fine steps (e.g., 1.5 ps with 100 ps baud interval and 64 phase interpolator).

Additional details regarding example embodiments of the timing recovery block 105 are provided below, for example, with respect to FIG. 5a.

The timing recovery block 105 may include both a coarse timing recovery block 142 and a fine timing recovery block 144. The purpose of these two structures will be described in more detail below. However, in general the coarse timing recovery block 142 may control the best sampling rate for the channel while the fine timing recovery block 144 may correct for timing mismatches that may occur due to the presence of the plurality of ADCs in the interleaved ADC block 118, and/or due to the presence and operation of the splitter 134 in splitting the received amplified signal from the coarse PGA 130 into a plurality of signals corresponding to the number interleaved ADCs.

The signal processing system 140 may also include a channel identification ("channel ID") block 102, which may output to the TVPD 196 of FIG. 3a, as shown therein. The structure and function of the channel ID block 102 will be described in more detail below. However, in general, the channel ID block 102 may determine representations of the communication channel characteristic at various instants in time. The channel characteristic may include, for example, an impulse response of the communication channel. As shown in FIG. 3b, the channel ID block 102 may provide information to the timing recovery block 105 to allow more efficient and accurate timing recovery operation. In particular, as shown in FIG. 3b, the channel ID block 102 may provide a parameter referred to herein as a DC offset 312 to the timing recovery block 105.

A channel ID ADC 104 (analogous to, or associated with, the auxiliary ADC 394 of FIG. 3a) may be provided for the channel ID block 102 to sample an input signal provided to the channel ID 102. As the channel ID 102 functions to determine a channel characteristic, which may be changing at a significantly lower rate than the symbol rate, the channel ID ADC 14 may operate at a different sampling rate than that of the ADCs comprising the interleaved ADC 118. According to one embodiment, the channel ID 102 operates at a sampling rate of 10 MHz.

As described in more detail below, the channel ID 102 may construct representations of the channel characteristic at any number of different phases. Representations for each phase may be stored at the channel ID block 102 and periodically a best phase may be determined. According to one embodiment a best representation of the channel is chosen that maximizes signal energy after accounting for dispersion and ISI.

A data path for the signal processing system 140 will now be described. A received analog signal 304 may first be received by a coarse programmable gain amplifier ("PGA") block 130. The PGA may be a variable gain amplifier. The coarse PGA block 130 may perform amplification on the received signal 304 to achieve a desired uniform amplitude level for the received signal 304. A digital control circuit (not shown in FIG. 3b) may receive one or more numerical values, which are used to control the overall gain of the coarse PGA circuit 130. The PGA circuit 130 may utilize any combination of passive and active circuit elements to achieve gain correction.

The received signal 304 having been processed by the PGA block 130 may then be provided to a splitter 134, which generates an appropriate number of replicas of the signal received from the PGA block 130. The splitter 134 may function to prepare the requisite number of inputs for the interleaved ADC block 118. For example, according to one embodiment, the interleaved ADC block 118 includes eight parallel ADCs. In this case, the splitter generates eight replicas of the signal received from the PGA block 130. The set of signals generated by the splitter 134 may not be of uniform amplitude due to component mismatch in the splitter 134 circuitry. In order to correct for this non-uniformity, each of the signals generated by the splitter 134 may be passed to a fine PGA block 114. The fine PGA block 114 may include a plurality of fine PGAs (not shown in FIG. 3b) each respectively providing individual amplitude amplification for each of the signals generated by the splitter 134.

The collection of parallel signals may then be passed to an interleaved ADC block 118. In particular, each of the fine PGAs comprising the fine PGA block 114 may pass its respective signal to an individual ADC within the interleaved ADC block 118. The interleaved ADC block 118 may perform baud rate sampling utilizing the set of received signals from the fine PGA 114. The structure and function of the interleaved ADC block 118 will be discussed in further detail below. In general, the ADC block 118 may comprise a plurality of ADCs, each operating at a sampling rate that may be significantly lower than the overall symbol rate of the telecommunications system. For example, according to one embodiment the symbol rate of the channel may be 10 Gbps and the interleaved ADC 118 includes 8 parallel ADCs each operating at a sampling rate of 1.25 Gbps.

As referenced above, and as described in more detail below, the CID block 102 may use the decision signal 310 and the output of the CID ADC 104 to determine information about an optimum phase information related to the communication channel. Then, the TVPD 196, e.g., within the coarse timing recovery block 142, may provide a regenerated or reference waveform, based on the optimum phase information, and the coarse timing recovery block 142 may compare the reference waveform to the actual output of the interleaved ADC block 118 to determine error information therebetween that may then be used to assist in performing timing recovery, e.g., by outputting a phase signal that may be used by a phase-locked loop (in a conventional manner) to instruct the sampling of the amplified received signal at the splitter 134 and at the interleaved ADC's 118.

Figure 4:
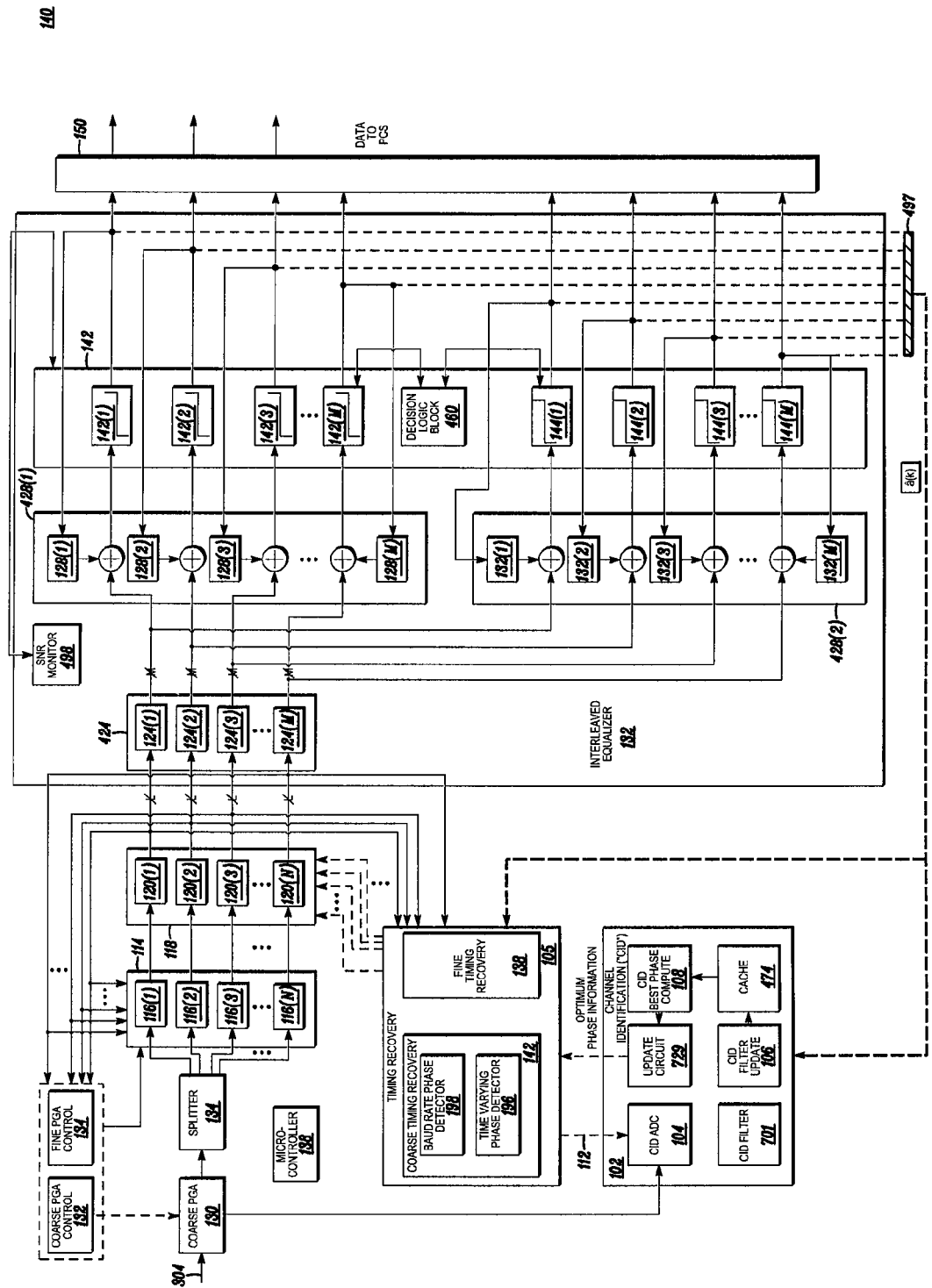
FIG. 4 further depicts a signal flow through a signal processing system for correcting for signal distortions introduced by a communication channel.

FIG. 4 further depicts a signal flow through a signal processing system for correcting for signal distortions introduced by a communication channel. A received signal 304 is provided to a coarse programmable gain amplifier ("PGA") 130. The coarse PGA 130 provides overall gain adjustment for the received signal 304. The output of the coarse PGA 130 may then be provided to a splitter circuit 134. The splitter circuit 134 may generate a plurality of copies (N) of the gain adjusted signal, which are each respectively provided to a fine PGA block 114. In particular, each of the outputs of the splitter block 134 is respectively provided to a parallel fine PGA circuit 116(1)-116(N). Each of the parallel fine PGA circuits 116(1)-116(N) may perform independent gain adjustment on the received signal 304, at the instruction of a digital control circuit such as the fine PGA control 134. The parallel fine PGA circuits 116(1)-116(N) may allow for gain adjustments that may be necessary to correct for non-uniform signal levels in the interleaved structures comprising the signal processing system 140.

Each parallel fine PGA circuit 116(1)-116(N) may provide an output to a respective ADC 120(1)-120(N) comprising an interleaved ADC 118. Each ADC 120(1)-120(N) may convert a respective analog signal provided by a corresponding fine PGA circuit 116(1)-116(N) into a digital signal. The structure and function of an interleaved ADC 118 will be described in detail below. However, in general, each ADC 120(1)-120(N) may sample an incoming signal from the fine PGA block 114 at a clock rate lower than the baud rate such that the effective sampling rate of the combined ADCs 120(1)-120(N) is the baud rate. This may be achieved, as described below, by introducing a phase offset for each ADC 120(1)-120(N) with respect to one another. For example, according to one embodiment, the baud rate is 10 Gbps while the interleaved ADC block 118 comprises 8 ADCs each operating at a sampling rate of 1.25 Gbps yielding an effective sampling rate of 10 Gbps. Each ADC 120(1)-120(N) may also operate at a particular bit resolution. According to one embodiment, each ADC 120(1)-120(N) provides 6 bit resolution.

The outputs of the interleaved ADC block 118 may be provided to an interleaved equalizer block 132 comprising an interleaved FFE 424, interleaved parallel decision feedback equalizer blocks 428(1), 428(2) and sequence DFE block 142. The interleaved FFE block 424 may perform signal processing operations to correct for precursor ISI. The interleaved FFE block 424 may include a plurality of FFE cells 124(1)-124(M). The number of FFE cells (M) may correspond to or may be different from the number of parallel ADCs 120(1)-120(N). Thus, each interleaved FFE cell 124(1)-124(M) may operate at a different clock rate than the clock rate of each ADC 120(1)-120(N). A buffer circuit (not shown in FIG. 4) may function to allow negotiation of the N outputs of the interleaved ADC block 118 (120(1)-120(N)) to be provided to M inputs of the interleaved FFE block 424 (124(1)-124(M)). According to one embodiment, the interleaved FFE block 424 comprises 16 FFE cells 124(1)-124(M) each operating at a clock rate of 625 MHz. The structure and function of each of the FFE cells 124(1)-124(M) will be described in detail below.

The interleaved PDFE blocks 428(1) and 428(2) may operate to correct for postcursor ISI. Each PDFE block 428(1) and 428(2) may include a plurality of summation blocks that respectively compute a summation of an output signal from a respective interleaved FFE cell 124(1)-124(M), and an output from a PDFE cell 128(1)-128(M) and 132(1)-132(M).

The output of each summing block may be provided to a respective slicer 142(1)-142(M), 144(1)-144(M) in the sequence DFE block 144. Each slicer 142(1)-142(M), 144(1)-144(M) may receive an input signal from a respective PDFE cell 128(1)-128(M), 132(1)-132(M), compare the input signal with a threshold value and output a decision signal â(k) indicating whether the signal value falls below or above the threshold value. According to one embodiment each decision signal â(k) may be a one bit signal representing +1 or −1 value. Each decision signal â(k) may be routed back to a respective PDFE cell 128(1)-128(M), 132(1)-132(M). Each PDFE cell 128(1)-128(M), 132(1)-132(M) may receive a decision signal â(k) from a respective slicer 142(1)-142(M), 144(1)-144(M) and output a value to a respective summing block. According to one embodiment, the output value of each PDFE cell 128(1)-128(M), 132(1)-132(M) may be a 16 bit value.

A decision logic block 480 in the sequence DFE block 142 may select a current valid PDFE from one of the PDFEs 428(1) and 428(2) as providing valid and correct data. More specifically, for example, when an output(s) of the FFE 424 falls within an uncertainty range, then the interleaved PDFE 428(1) and 428(2) may be forced to different values (e.g., 1 and −1), and the decision logic block may accumulate an error measurement for each PDFE 428(1), 428(2) over a number of following (e.g., sequentially following) bit periods, and then select the PDFE having the lower error over that number of bit periods.

Any number of the plurality of decision signals from each slicer for the current valid PDFE (i.e., either 142(1)-142(M) or 144(1)-144(M)) may be routed to a CID block 102 and/or a timing recovery block 105. As noted with respect to FIG. 3b, the CID block 102 may provide optimum phase information for a TVPD functionality and the timing recovery block 105 also may provide baud rate phase detector functionality.

The CID block may include a CID ADC 104, which may sample the received signal 304 (after processing by the coarse PGA 130). Because the channel characteristic may be changing at a relatively low rate with respect to the baud rate, the CID ADC 104 may operate at a much lower clock rate than the baud rate. According to one embodiment, for example, the CID ADC 104 may operate at 10 MHz. Because the CID block 102 may operate at a significantly lower rate than the baud rate, according to one embodiment, only a subset of the decision signals â(k) may be routed to the CID block 102 and timing recovery block 105. This may be accomplished using a multiplexer or buffer 497, which may select one or more decision signals â(k) to route to the CID block 102 and/or timing recovery block 105.

The CID block 102 may also include a CID filter update block 106, a CID filter 701, an update circuit 729, a cache 474 and a CID best phase compute block 108. The CID filter update block 106 may receive a subset of decision signals â(k) from the current valid PDFE and based upon this information as well as the sampled received signal 304, the CID filter 701 may be used to update a current channel characteristic for the channel parameterized by a phase, as described in detail with respect to FIGS. 7a and 7b, below. Generally, as noted above, the CID block 102 may compute a channel characteristic for a plurality of phases. According to one embodiment, the CID block computes a channel characteristic for 16 different phases. The timing recovery block 105 may send a CID phase update signal 112 to the CID ADC 104 to control the sampling phase for the plurality of channel characteristic phase computations. According to one embodiment, the CID phase update signal 112 may be updated periodically to cause the CID block to begin generating a channel characteristic for a new phase.

The channel characteristics for the various phases may be cached at the CID block 102 using a cache 474. A CID best phase compute block 108 may periodically compute a best phase among the plurality of different channel characteristics that have been stored at the cache 474 and provide this channel characteristic to an update circuit 729 (described in more detail below, with respect to FIG. 7c), which may thus provide the optimum phase information associated with the channel characteristic to the TVPD block 196. The TVPD block 196 may perform a TVPD operation utilizing a channel characteristic provided by the CID best phase compute block 108. The TVPD block 196 also may receive a plurality of decision signals 310 from which (together with the optimum phase information/channel characteristic) it may generate a reference waveform (e.g., using reference waveform generator 703 of FIG. 7b) to be compared to an output of the interleaved ADCs 118, to thus obtain error information therebetween for determining a phase signal for instructing a PLL (e.g., the PLL 804 of FIG. 7b).

The fine timing recovery block 138 may receive the outputs of the interleaved ADCs 120(1)-120(N). Due to process variations the plurality of ADCs 120(1)-120(N), as well as circuitry related to driving the ADCs and/or the splitter 134, may encounter timing discrepancies. Based upon the inputs provide from the interleaved ADCS 120(1)-120(N), the fine timing recovery may provide a plurality of output signals to correct for timing variations for the ADCs 120(1)-120(N).

Finally in FIG. 4, a signal-to-noise (SNR) monitor 498 is illustrated that represents any suitable technique for detecting performance levels or characteristics of the EDC system 140.

Figure 11:
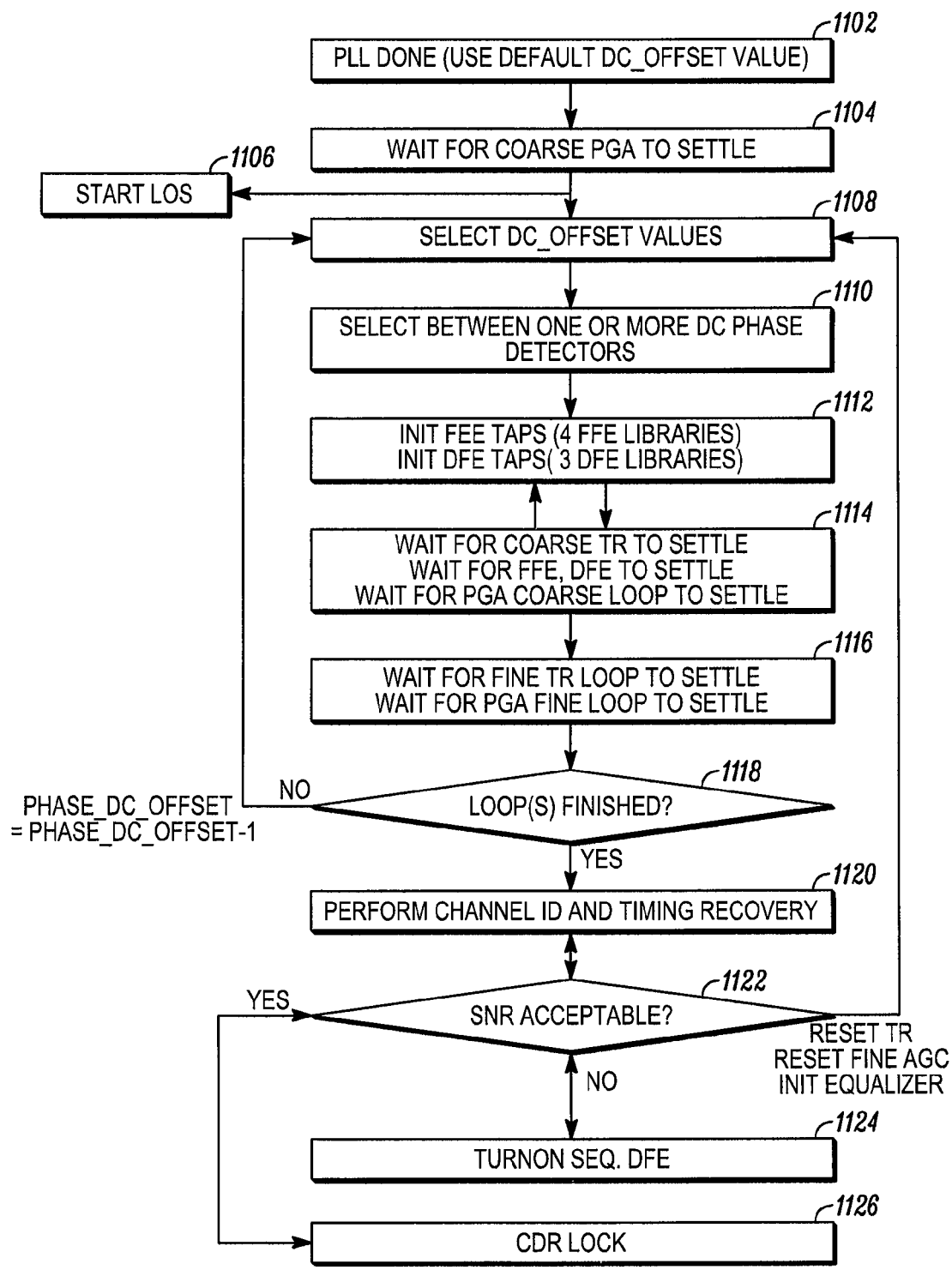
FIG. 11 is a flowchart of an operation performed by a start-up state machine of one embodiment.

For example, the EDC system 140 may be required to maintain certain levels of bit error rate or other performance characteristic in order to stay in a steady-state operational mode, and if some error threshold is breached, then the EDC system 140 may be returned to a start-up state for recalibration of various settings of the EDC system, as described in more detail herein, e.g., with respect to the start-up state machine 126 and with respect to FIG. 11.

Although FIG. 4 shows particular functional operations as being associated with particular structures, this is merely exemplary and it will be understood by skilled practitioners that the organization and execution of particular operations or functions may be carried out by any combination of structures in FIG. 4. For example, although FIG. 4 shows a TVPD as being associated with a the timing recovery block 105, the TVPD operation or some portion of it may in fact be carried out at the CID block 102.

Figure 5A:
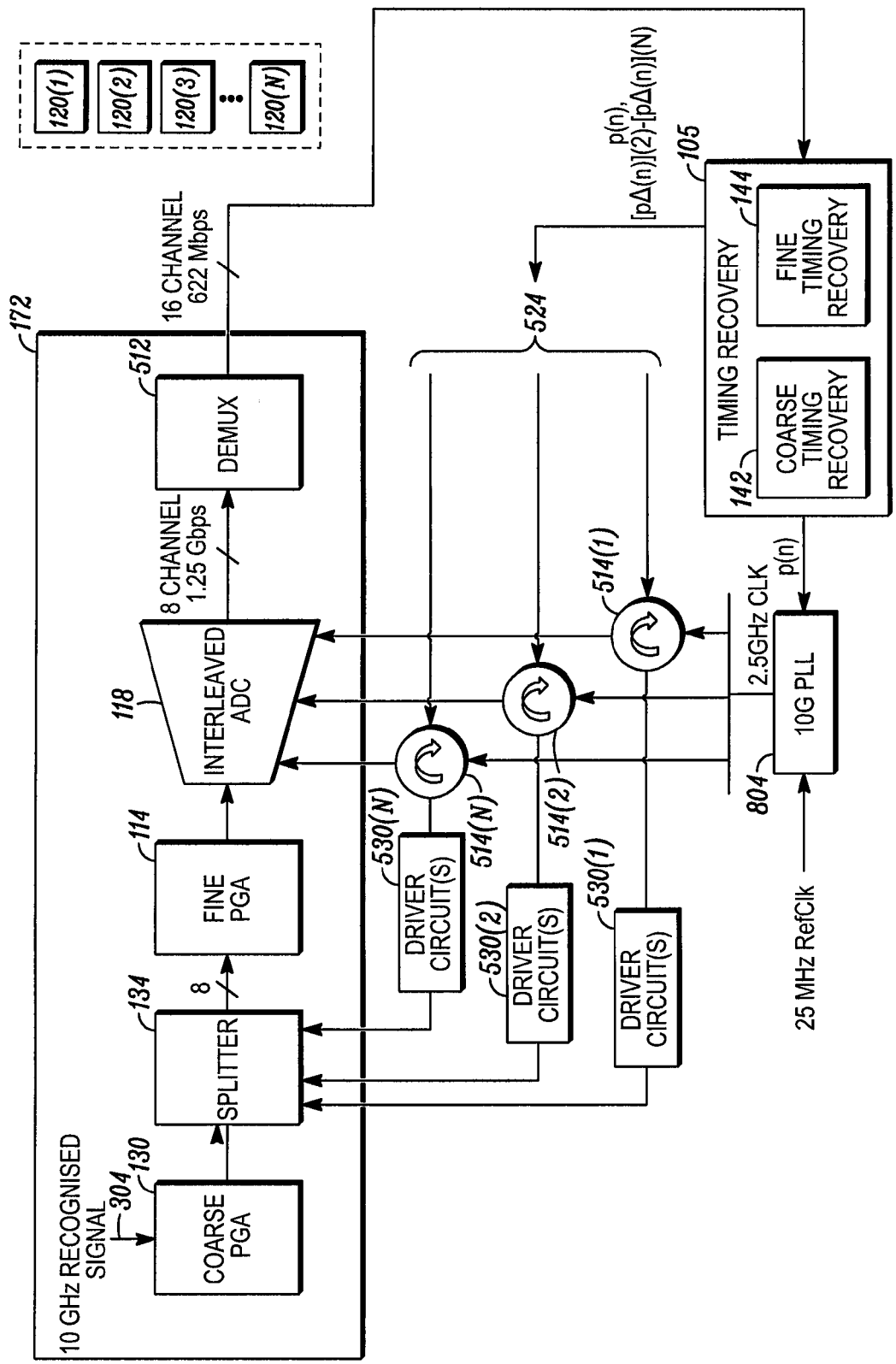
FIG. 5a depicts an example operation of an interleaved ADC according to one embodiment.

FIG. 5a depicts an operation of an interleaved ADC according to one embodiment. As noted with respect to FIGS. 3a, 3b and 4, an interleaved ADC may be provided in a data path 172 for correcting for waveguide dispersion and ISI. The data path may include among other components a coarse PGA 130, a splitter 134, a fine PGA 114 an interleaved ADC 118 and a DEMUX circuit 512.

The interleaved ADC 118 may operate to achieve an effective sampling rate commensurate with the baud rate or symbol rate of a received signal 304. For example, according to one embodiment the baud rate of the received signal 304 may be 10 Gbps. As noted with respect to FIG. 4, the interleaved ADC 118 may include a plurality of ADCs 120(1)-120(n). Each ADC 120(1)-120(n) may be driven by a common sampling clock signal, which may be adjusted by a timing recovery block 105 to correct for clock drift between the receiver and transmitter clocks, so that each ADC 120(1)-120(N) effectively has its own sampling clock.

In particular, the timing recovery block 105 may generate a phase signal p(n), as described below with respect to FIGS. 7a-7c, which may be provided to a PLL 804. The PLL 804 may generate an output signal for controlling a sampling phase of the plurality of ADCs 120(1)-120(n). According to one embodiment, the PLL 804 controls a single clock phase, which according to one embodiment may operate at 2.5 GHz. The single clock may be replicated via a plurality of phase interpolators 514(1)-514(n). Each phase interpolator may generate an interpolated version of the single clock signal and may respectively control a particular ADC 120(1)-120(n). Further, as shown, each phase interpolator 514(1)-514(n) may control a corresponding circuit (e.g., a sample-and-hold circuit, as in the example of FIG. 5b) within the splitter 134. Between each phase interpolator 514(1)-514(n), corresponding driver circuit(s) 530(1)-530(n) may be used to drive or otherwise operate the splitter 134. For example, the driver circuits may include buffering, amplifying, or timing circuits (e.g., clocks) that are used by the splitter 134 and/or the ADCs 118. Further, as the splitter 134 may involve digital circuits, the driver circuits may include analog-to-digital converters. Still further, there may be relatively lengthy signal path on the chip between the interpolators and the splitter 134 and/the ADCs 118. Thus, these referenced factors, and other factors, may lead to non-idealities in the operation of the splitter 134, and, thus, of the interleaved ADCs 118. A fine timing recovery block 144 in the timing recovery block 105 may be used to individually adjust each phase interpolator 514(1)-514(n) to account for timing variations that may be related to these non-idealities, so that the interleaved ADCs 118 operate, for practical purposes, as a single ADC at the buad rate. For example, a first phase interpoloator/ADC pair may be selected as a reference, and the remaining phase interpolator/ADC pairs may be adjusted relative to this reference pair. Thus, a first phase interpolator/ADC pair 514(1)/120(1) may operate based on p(n), while each phase interpolator/ADC pair other than the reference pair may operate based on a corresponding difference or delta between p(n) and a phase necessary to maintain relative timing of each pair, i.e., [pΔ(n)](2)-[pΔ(n)](N).

Figure 5B:
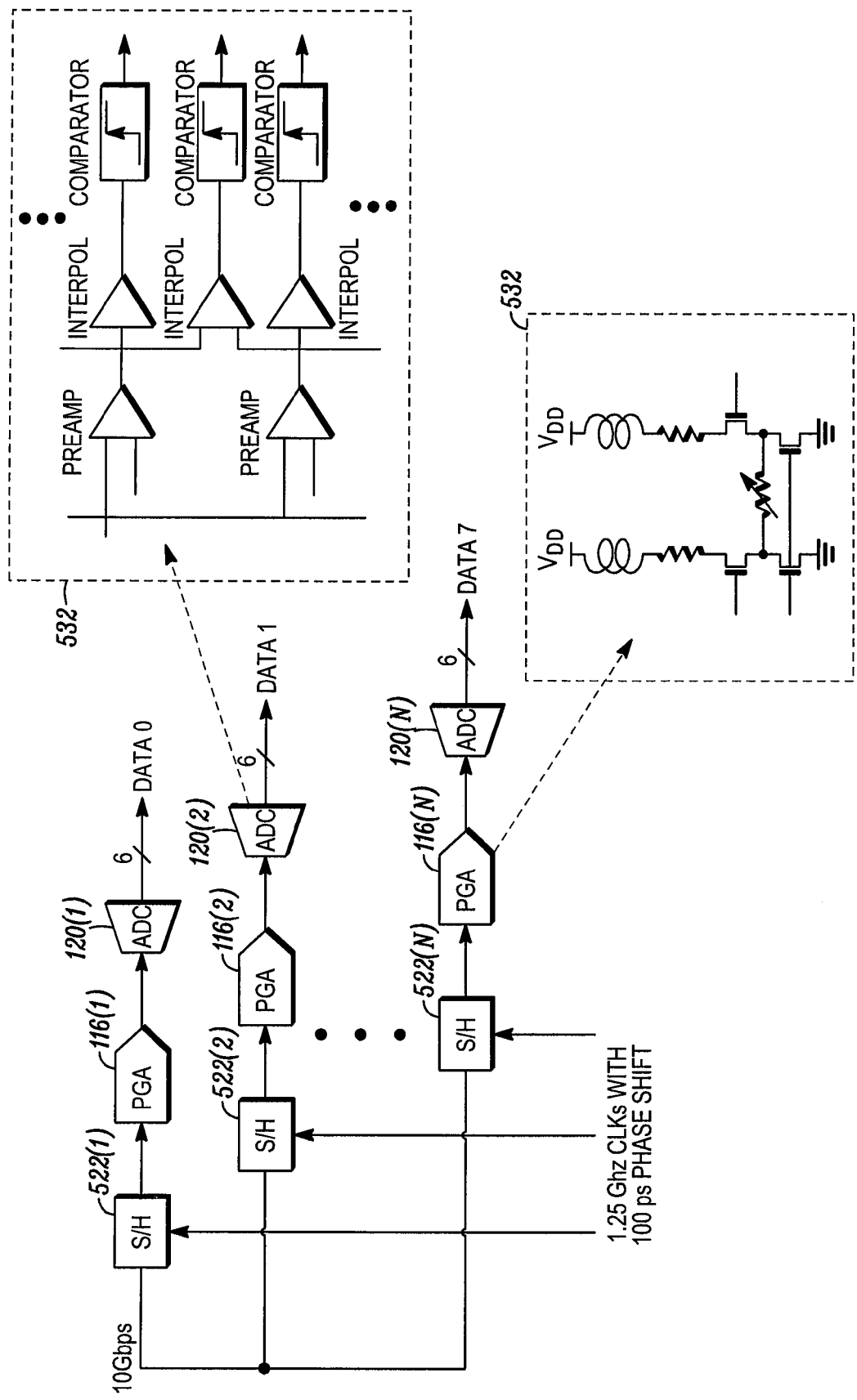
FIG. 5b shows a more detailed view of an ADC architecture according to one embodiment.

FIG. 5b shows a more detailed view of an ADC architecture according to one embodiment. In FIG. 5b, the splitter 134 is shown to include a plurality of sample and hold circuits 522(1) to 522(N), which individually drive PGAs 116(1)-116(N), as shown. Circuit 532 provides an example of a gain circuit in which a variable resistance is used to vary the overall gain of the PGA 116(N). Meanwhile, a circuit 534 provides an example of an ADC circuit using a flash ADC. Circuits 532 and 534 are merely examples, and other suitable circuits may be used, as well. As shown in FIG. 5b, the sample-and-hold circuits 522(1)-522(N) are designed to receive 1.25 GHz clock signals (e.g., each sample-and-hold circuit may receive 2 non-overlapping clock signals) to thereby sample the incoming signal at 100 ps intervals. As referenced above, the fine timing recovery circuit 144 may be used to adjust timing information provided to the phase interpolators of FIG. 5a, so that these 100 ps intervals are maintained despite the presence of relative non-idealities in the various driver circuits 530(1)-530(N) (e.g., due to temperature, process, or other mismatches in the design and fabrication thereof).

Figure 5C:
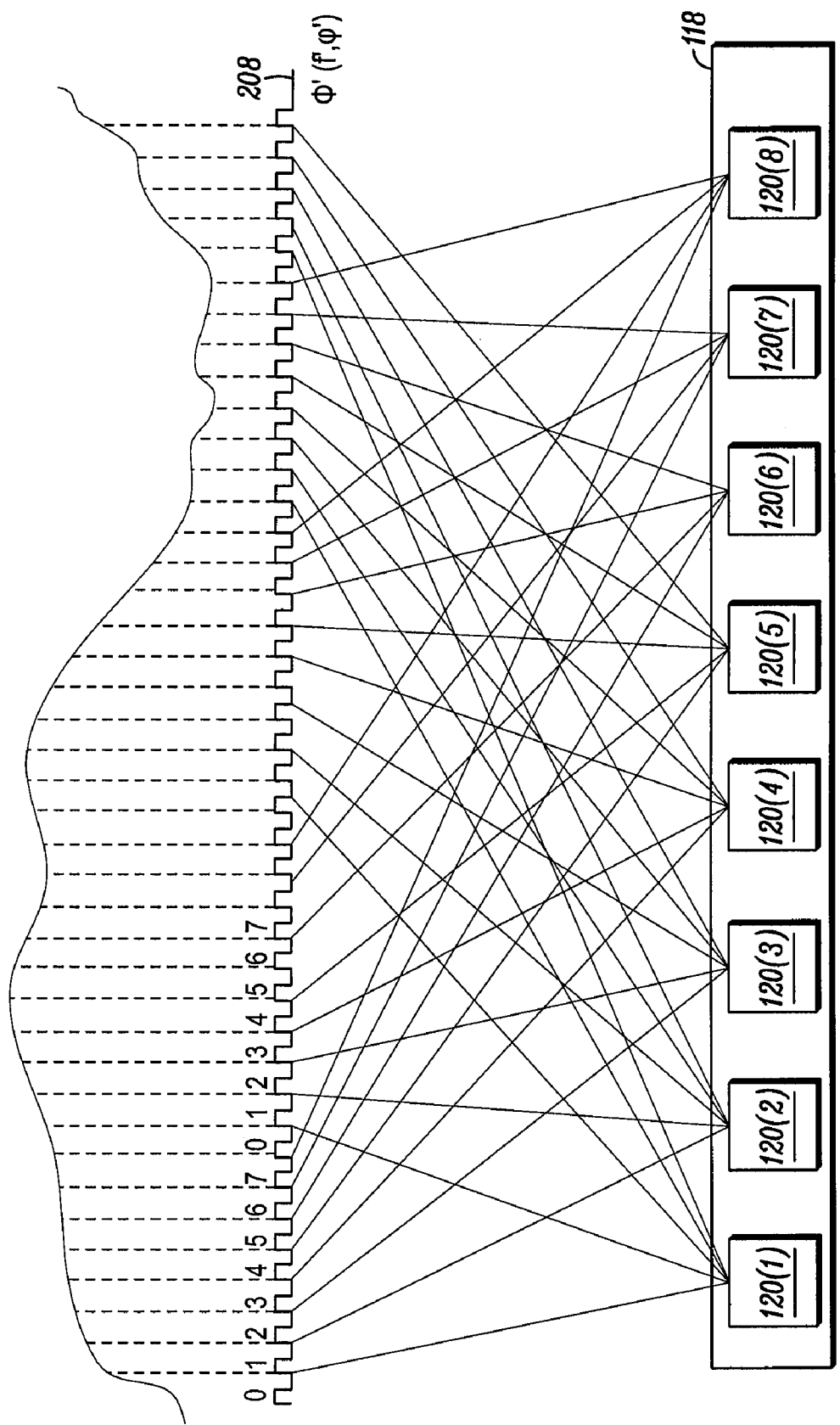
FIG. 5c depicts an overall operation of an interleaved ADC according to one embodiment.

FIG. 5c depicts an overall operation of an interleaved ADC according to one embodiment. As described above, an interleaved ADC 118 may include a plurality of ADCs 120(1)-120(n). Each ADC 120(1)-120(n), may be triggered by an receiver clock 208 on a particular cycle. The effective rate of the receiver clock 208 may be the baud rate of the transmitted signal. However, the clock rate of a particular ADC 120(1)-120(n) may be significantly lower than the baud rate.

Figure 6A:
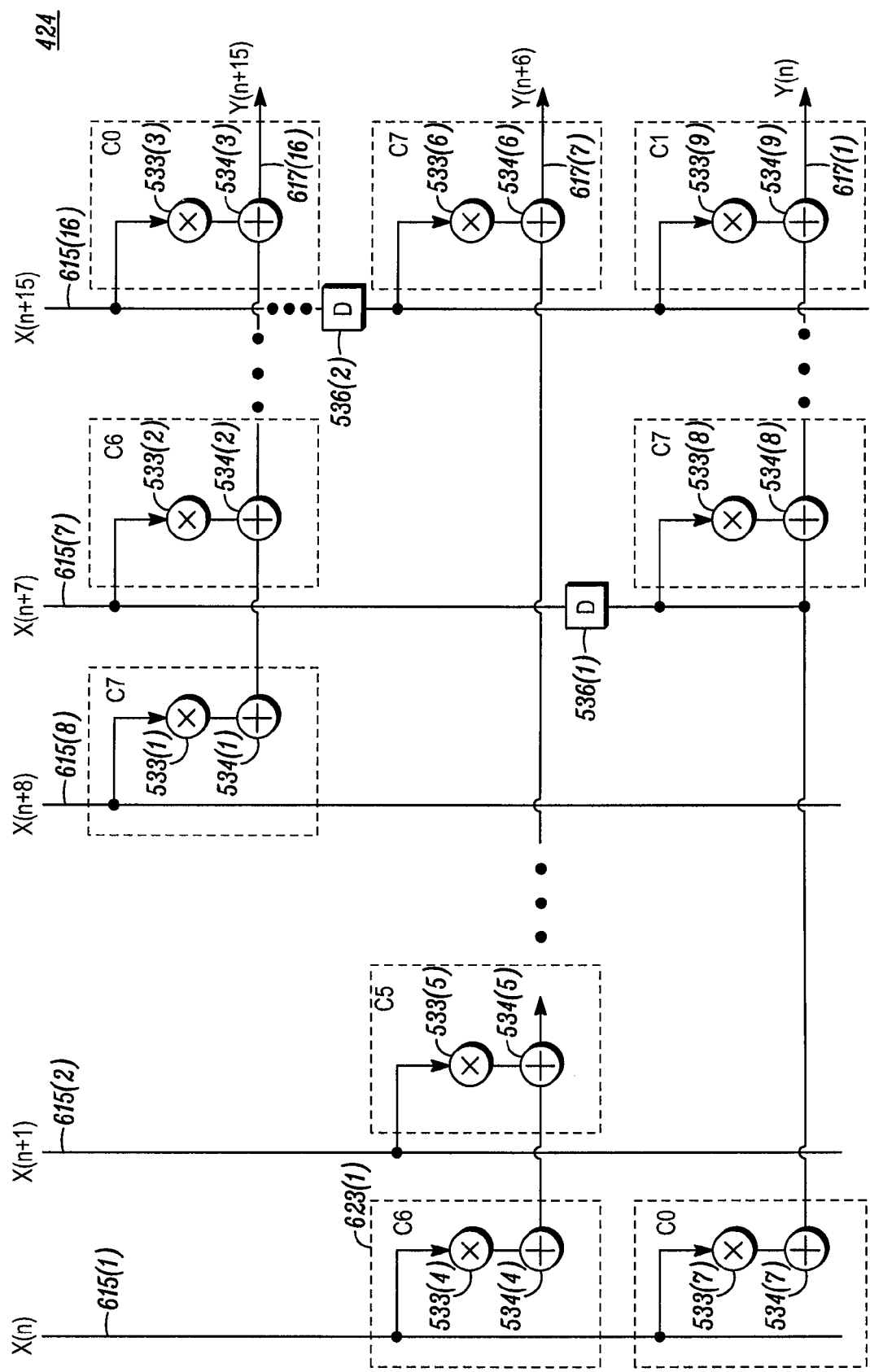
FIG. 6a depicts a signal path for an interleaved FFE.

FIG. 6a depicts a signal path for an interleaved FFE. According to one embodiment the interleaved FFE may utilize a parallel structure for receiving 16 input signals X(n)-X(n+15) and generating 16 output signals Y(n)-Y(n+15). This is merely exemplary, and an interleaved ADC may include any number of input signals and any number of output signals. A serial FFE with, for example, 8 taps may be implemented as a convolution of an input signal with an FIR.

$$y(n) = \sum_{i=0}^{7} c(i)x(n-i)$$

According to one embodiment, an interleaved FFE 118 generates 16 outputs y(n)-y(n+15) as a function of 16 inputs x(n)-x(n+15) according to the following relationships.

$y(n)=c(0)x(n)+c(1)x(n-2)+c(2)x(n-2)+c3x(n-3)+\ldots+c(7)x(n-7)$ $y(n+1)=c(0)x(n+1)+c(1)x(n)+c2x(n-1)+c3x(n-2)+\ldots+c(6)x(n-6)\ldots$ $y(n+15)=c(0)x(n+15)+c(1)x(n+14)+c2x(n+13)+c3x(n+12)+\ldots+c(7)x(n+8)$ Referring to FIG. 6a, an interleaved FFE 424 may receive a plurality of inputs x(n)-x(n+15) on a plurality of respective input lines 615(1)-615(16). The FFE 424 may generate a plurality of outputs y(n)-y(n+15) on a plurality of output lines 617(1)-617(16). Each input line 615(1)-615(16) may include a plurality of multiply and accumulate ("MAC") blocks 623(1)-623(*n*). Each MAC block 623(1)-623(*n*) may include a respective multiplication block 533 and summation block 534. Each MAC block 623(1)-623(*n*) may be coupled to a respective input line 615(1)-615(16) via its multiplication block 533, which provides an input port for the MAC block 623. Each MAC block 623 may be coupled to a different input line 615(1)-615(16) via its respective summation block 534, which serves as an output port for the MAC block 623.

An input (x(n)-x(n+15)) for a particular input line 615(1)-615(16) may be provided to the plurality of MAC blocks coupled to that input line via the MAC block's respective multiplication block 533, where it may be multiplied by a respective coefficient CX and then provided to a respective summation block 534 for that MAC block 623. The output of a respective summation block 534 may be combined with the outputs of other MAC blocks 623 coupled to different input lines.

Figure 6B:
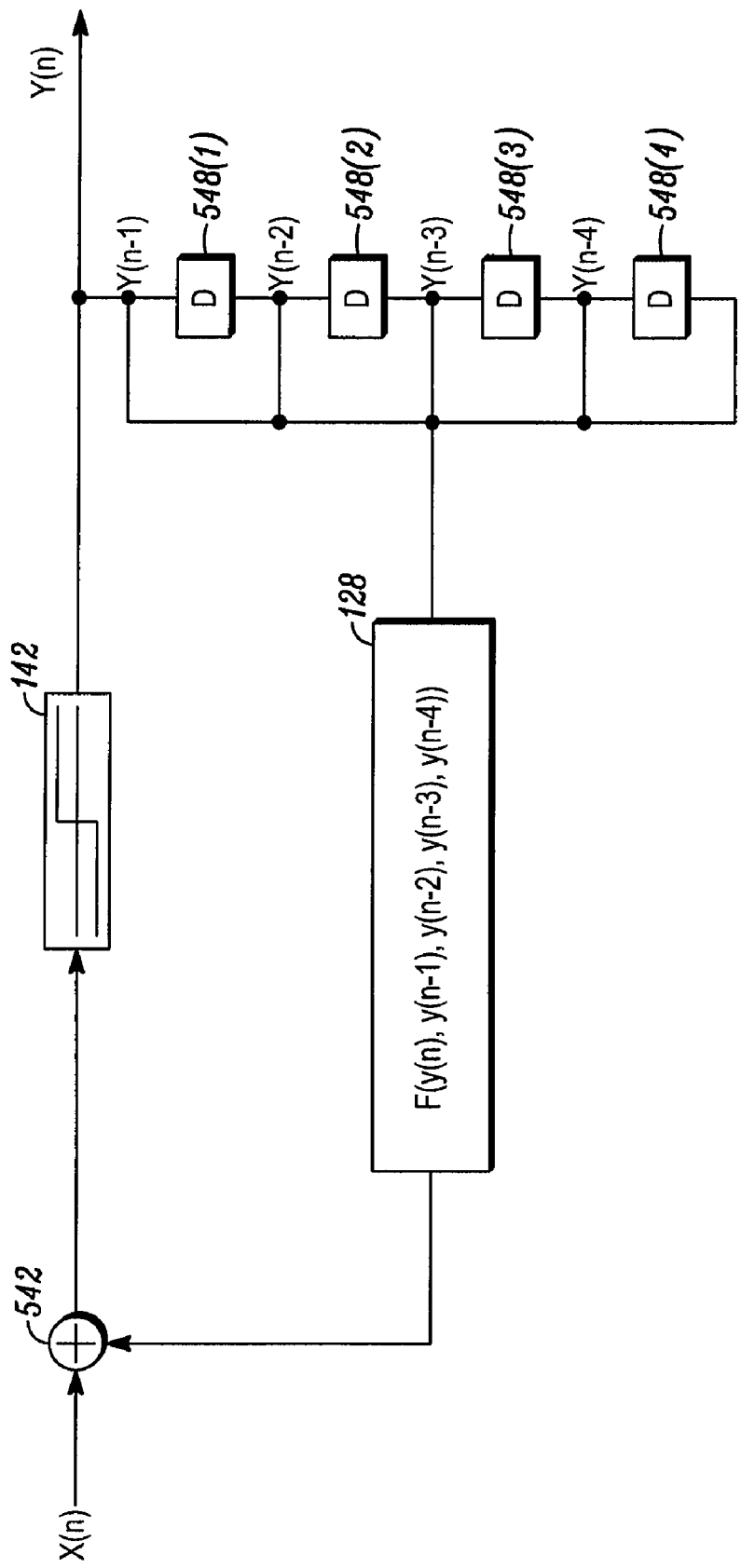
FIG. 6b depicts a serial DFE cell according to one embodiment.

FIG. 6*b* depicts a serial PDFE cell according to one embodiment. The arrangement shown in FIG. 6*b* may represent one channel in a parallel array for an interleaved PDFE 428(1), 428(2). An input signal x(n) may be provided to a summation block 542 where it is additively combined with an output from a PDFE cell 128. The output of the summation block 542 may then be provided to a slicer 142, which may generate a binary signal (e.g., +1, −1) depending upon whether the input to the slicer 142 is less than or greater than zero. The output of the slicer 142 may be provided to a plurality of delay elements, for example, 548(1)-548(4), which generate respective delayed signals y(n)-y(n−4). The delayed output signals y(n)-y(n−4) may be provided back to the PDFE element 128, which generates an output signal F(y(n), y(n−1), y(n−2), y(n−3), y(n−4)). The output signal F(y(n), y(n−1), y(n−2), y(n−3), y(n−4)) may be a linear combination of the delayed signals y(n)-y(n−4). According to one embodiment, each binary signal y(n)-y(n−4) may be multiplied by a 16 bit coefficient to generate a 16 bit number. These 16 bit values may then be combined in a linear relationship via the PDFE element 128.

Figure 7A:
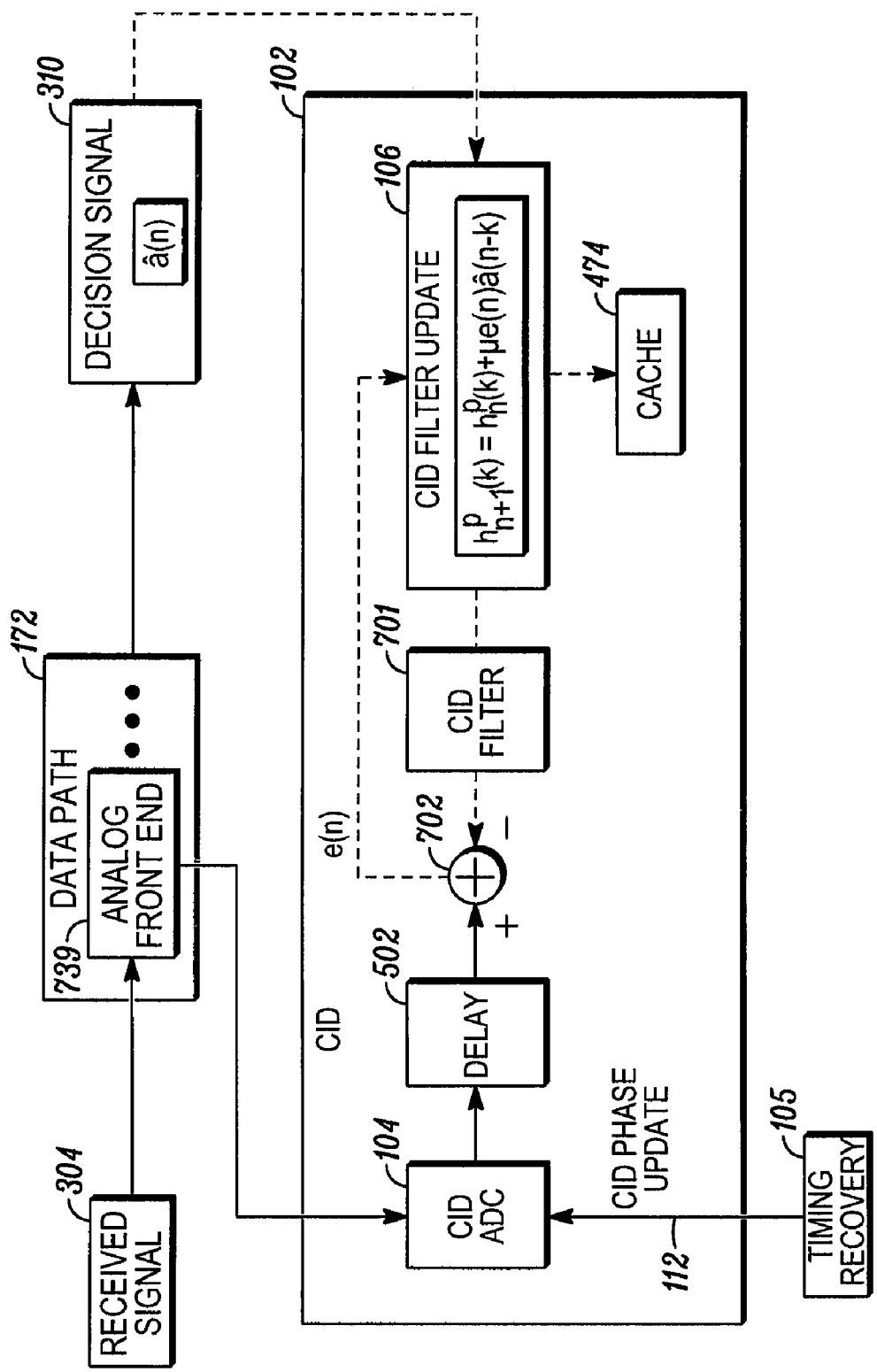
FIG. 7a depicts an operation of a channel identification filter update block according to one embodiment.
Figure 7B:
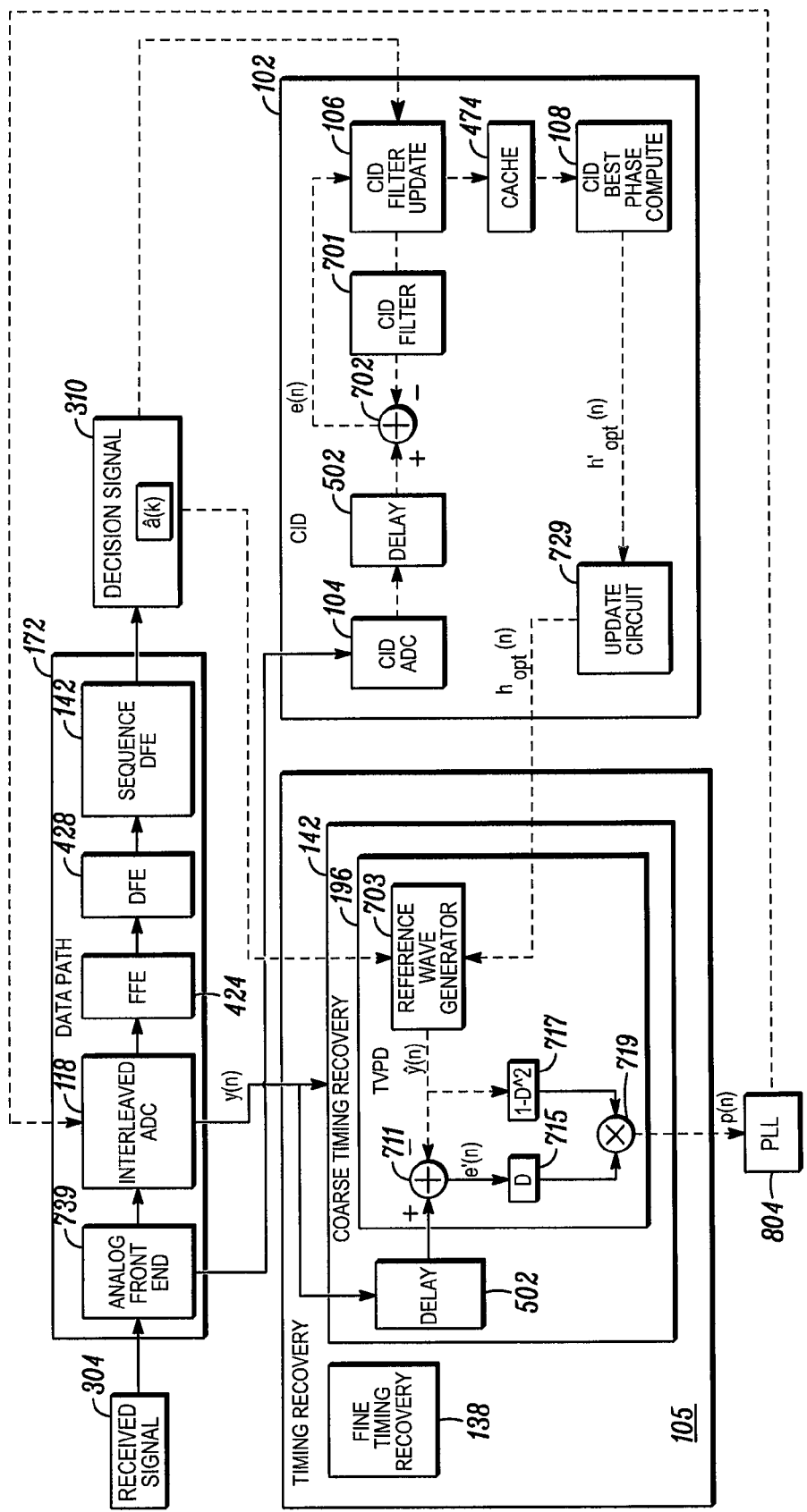
FIG. 7b depicts an operation of a channel identification block to determine channel characteristic information for assisting a timing recovery operation according to one embodiment.

FIG. 7*a* depicts a partial operation of a CID filter update block 106 according to one embodiment. A more detailed example of a timing recovery and channel identification operation(s) is provided below, with respect to FIGS. 7*b* and 7*c*. In FIG. 7*a*, the CID filter update block 106 may be included within a TVPD 196 or CID 102 and may perform an update of an estimated channel characteristic for a communication channel 182. As noted above, the channel characteristic may be an impulse response for the communication channel 182. The CID filter update block 106 may calculate a plurality of channel characteristics for a plurality of different sampling phases for the communication channel 182. Thus, for example, in the case where the channel characteristic is an impulse response, the CID filter update may compute a plurality of estimated channel impulse responses parameterized by a phase parameter (p) and an iteration parameter (n), $h_n^P(k)$. As described below, a CID best phase compute block 108 may compute a best phase channel characteristic from the plurality of channel characteristics, which may be utilized to provide a timing recovery assist signal to a timing recovery block 105 to assist in timing recovery (not shown in FIG. 7).

The CID filter update block 106 may update a next iteration of the estimated channel impulse response for a given phase $h_{n+1}^P(k)$ by computing an error signal e(n). The error signal e(n) may be computed by taking a difference between the sampled received signal 304 and the decision signal â(n) 310 after processing by the CID filter 701. For example, the CID filter update block 106 may provides coefficients "h" for each phase $h_{n+1}^P(k)$ to the CID filter 701, for generation thereby of a waveform for comparison to the delayed output of the CID ADC 104, as shown, and subsequent determination of e(n).

Referring again to FIG. 7*a*, a received signal 304 may be provided to a data path 172 (described above with respect to FIGS. 3*a*, 3*b* and 4). After processing via the data path 172, a decision signal â(n) 310 may be rendered. As noted above with respect to FIG. 4, the data path 172 may render a plurality of decision signals, wherein only a subset of the decision signals are selected for routing to a CID block 102, for example via a multiplexer or router. This may be possible due to the fact that the CID block may operate at a lower clock rate than the baud rate. The decision signal(s) 310 may then be provided to a CID filter update block 106 at a CID block 102.

As shown in FIG. 7*a*, the received signal 304 may also be provided to a CID ADC 104, which performs analog to digital conversion on the received signal. The CID ADC 104 may operate at a clock rate sufficient to perform tracking of the time varying nature of a channel characteristic. According to one embodiment, for example, the CID ADC 104 may operate at 10 MHz. The timing recovery block 105 may provide a CID phase update signal 112 to the CID ADC 104 to control the sampling phase of the CID ADC 104. The timing recovery block 105 may update the CID phase update signal 112 on a periodic basis. According to one embodiment, the CID block 102 may compute estimated channel impulse responses for 16 different phases $h_{n+1}^P(k)$.

After sampling by the CID ADC 104, a sampled version of the received signal may be provided to a delay block 502. The delay block may be necessary to compensate for delay of the received signal 304 through the data path 172. The delayed version of the sampled version the received signal 304 may then be provided to a summation block 702, which may compute the difference of the sampled and delayed received signal 304 and the output of the CID filter 701 to generate an error signal e(n). The error signal e(n) may then be provided to the CID filter update block 106 for processing a subsequent iteration of the estimated channel impulse response.

According to one embodiment, the CID filter update block 106 may calculate a next iteration $h_{n+1}^P(k)$ of the estimated channel impulse response utilizing the decision signal â(n), the error signal e(n), a previous iteration of the estimated channel impulse response $h_n^P(k)$ and a parameter μ. According to one embodiment the CID filter update block 106 may compute a next iteration of the estimated channel impulse response utilizing the relation:

$$h_{n+1}^P(k)=h_n^P(k)+\mu e(n)\hat{a}(n-k)$$

FIG. 7*b* depicts an operation of a CID block to determine channel characteristic information for assisting a timing recovery operation according to one embodiment. In general, the optimal estimated impulse response $h_{opt}(n)$ and the decision signal may be utilized by a reference wave generator 703 to regenerate an estimate of the received signal y(n) which may serve as a timing recovery assist signal ŷ(n). The timing recovery assist signal ŷ(n) 312 may be provided to assist in a timing recovery operation. In particular, the coarse timing recovery block 142 in the timing recovery block 105 may receive the timing recovery assist signal y(n) 312 and utilize the timing recovery assist signal 312 in a Mueller-Muller algorithm to perform timing recovery operations such that a phase signal p(n) is generated to drive a PLL 804 controlling a sampling phase of an interleaved ADC 118.

Although FIG. 7*b*, ascribes particular functional blocks to perform certain functions and/or operations, it will be understood by skilled practitioners that this is merely exemplary. The utilization of a channel characteristic (e.g., an estimated impulse response of a communication channel) to assist and/or perform timing recovery operations for a communication system may be performed by a single functional unit or multiple function units. Furthermore, the operations ascribed to the TVPD 196 may be performed in fact by a CID block 102 rather than by a timing recovery block 105. As another example, the CID filter 701 may be performed by the same or similar block as the reference wave generator 703.

According to an exemplary embodiment, a CID block 102 may in include a CID ADC 104, a delay 502, a summation block 702, a CID filter update block 106, a cache 474 and an update circuit 729. A received signal 304 is provided to a data path 172 including an analog front end 739, an interleaved ADC 118, an FFE 424, a DFE 428 and a sequence DFE 142 in a signal processing system 140. The analog front end 739 may perform analog processing on the received signal 304 including amplitude adjustment of the received signal. The output of the analog front end 739 may be provided to a CID ADC 104 in the CID 102. The CID ADC 104 may perform analog to digital conversion of the output of the analog front end 739. The CID ADC 104 may operate at a data rate significantly lower than the baud rate.

The output of the analog front end 739 may also be provided to an interleaved ADC 118, followed by an interleaved FFE 424, an interleaved DFE 429 and a sequence DFE 142. The sequence DFE 142 may output a decision signal 310, which may be provided to a CID filter update block 106 in the CID 102 and the reference wave generator 703. The operation of a CID filter update block 106 has already been described with respect to FIG. 7a. That is, after analog to digital conversion is completed by CID ADC 104, the output of the CID ADC 104 may be provided to a delay 502. The output of delay 502 may be provided to a summation block 702 where a difference signal (e(n)) is computed with the output of the CID filter update block 106, which may then be provided back to the CID filter update block 106 and thus to the CID filter 701.

The CID 102 may also include a cache 474. The updated estimated channel impulse responses as calculated by the CID filter update block 106 may be provided to and stored in the cache 474. As described in more detail below, the cached estimated channel responses parameterized by a phase parameter (p) may be analyzed periodically by a best phase compute block 108, which may compute an optimal estimated channel impulse response (i.e., best phase) utilizing a predefined metric.

The optimal estimated channel impulse response (h'$_{opt}$(n)) may be provided to the update circuit 729 (described in detail below with respect to FIG. 7c), and thus to the reference wave generator 703 within the TVPD 196, as shown. The TVPD 196 may thus utilize the optimal estimated channel impulse response h$_{opt}$(n) to perform a TVPD operation in order to generate a timing recovery assist signal (ŷ(n)) 312, which it may provide to assist in timing recovery operations. In particular, the TVPD 196 also may receive the decision signal 310 and may utilize the decision signal 310 to generate a reconstructed or regenerated version of the received signal y(n) using the current estimated optimal impulse response h$_{opt}$(n). The regenerated version of the received signal ŷ(n) may serve as a timing recovery assist signal that may be provided to a timing recovery block 105 to be used for a timing recovery operation. According to one embodiment, the timing recovery assist signal ŷ(n) 312 may be computed as a convolution of the current optimal estimated impulse response h$_{opt}$(n) and the decision signal 310 according to:

$$\hat{y}(n) = \sum_j h_{opt}(j)\hat{a}(n-j)$$

Upon receiving the timing recovery assist signal 310, the timing recovery block 105 may perform a timing recovery operation utilizing the Mueller-Muller algorithm. In particular, the timing recovery block 105 may compute a slope of the regenerated waveform ŷ(n) and multiply this slope with the error between the actual data received by a data ADC y(n) and the regenerated waveform ŷ(n). In order to perform this operation, the timing recovery block may include a plurality of delay elements to align the actual data signal and the regenerated signals. Referring to FIG. 7b, the timing recovery block 105 may include a coarse timing recovery block 142. The coarse timing recovery block 142 may generate a phase signal p(n) for controlling the overall sampling phase of the ADCs comprising the interleaved ADC 118 (described in detail below).

The coarse timing recovery block may include a delay block 502, a summation block 711, a first delay element 715, a second delay element 717 and a multiplication block 719. At least one output from the plurality of ADCs comprising the interleaved ADC 118 may be provided to a delay 502 in the coarse timing recovery block 142 in order that it may be aligned with the reconstructed signal ŷ(n). The output of the delay 502 may be provided to a summation block 711 where it is combined with the timing recovery assist signal ŷ(n) 312 to produce a difference signal e'(n). The difference signal e'(n) may be computed as:

$$e'(n)=y(n-k)-\hat{y}(n)$$

The difference signal e'(n) may be provided to a delay element 715, which generates a one sample delayed version of the error signal e(n−1), which may be provided to a multiplication block 719. The timing recovery assist signal ŷ(n) 312, may also be provided to a second delay element 717, which may generate a copy of the timing recovery assist signal ŷ(n) 312 and a delayed version of the timing recovery assist signal ŷ(n) 312 delayed by two samples. The outputs of the first and second delay elements 715 and 717 may be provided to a multiplication block 719, which multiples the two signals to generate a phase signal p(n) as output. Thus, the phase signal p(n) may be computed as the multiplication of the error signal e'(n) and the slope of the (regenerated) waveform.

$$p(n)=e'(n)*[\hat{y}(n-1)-\hat{y}(n+1)]$$

In other words, it may be understood from the above explanation that ŷ(n) represents the convolution of the computed impulse response to the decision of the DFE (or sequence DFE), and thus the expected value of y(n) assuming the impulse response is valid. Consequently the error signal e'(n) multiplied by the slope of the regenerated waveform ŷ(n) as represented by [ŷ(n−1)−ŷ(n+1)], and according to the Mueller Muller algorithm, results in the phase signal p(n). The phase signal p(n) may be provided to a PLL 804, which is utilized to control the sampling phase of the interleaved ADCs comprising the interleaved ADC block 118.

Figure 7C:
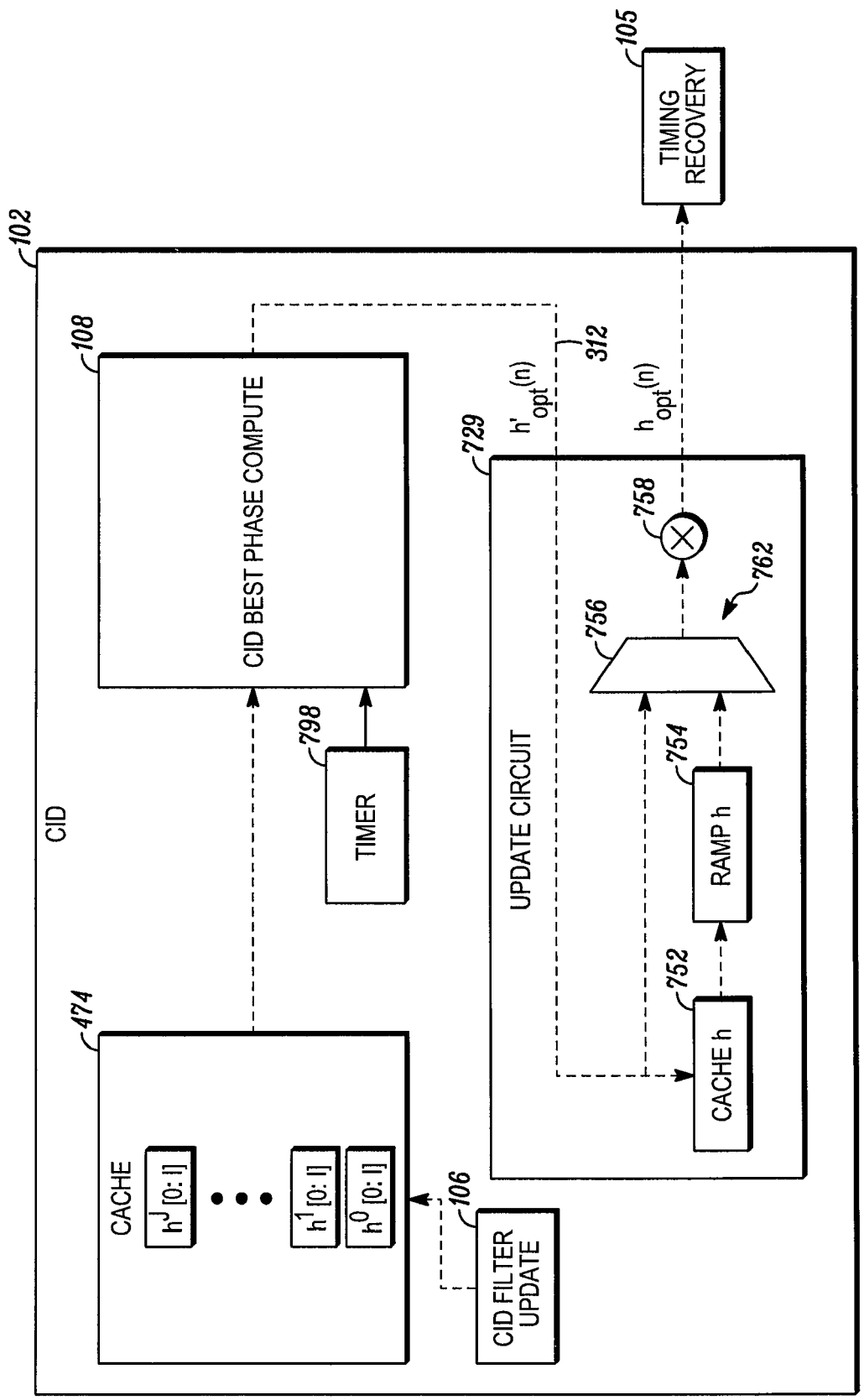
FIG. 7c depicts an operation of a best phase compute block according to one embodiment.

FIG. 7c depicts an operation of a best phase compute block according to one embodiment. The best phase compute block 108 may be included within a CID block 102 and may determine an optimal estimated impulse channel characteristic h'$_{opt}$(n) 312 for a plurality of channel characteristics parameterized by a phase. As noted previously, a CID filter update block 106 may store in a cache 474 a plurality of estimated impulse responses h$^0$[0:I]-h$^1$[0:I], each of which may be parameterized by a distinct phase from 0-i. According to one embodiment, each estimated impulse response h$^0$[0:I]-h$^1$[0:I] stored in the cache may be associated with a plurality of taps, for example i may be 6.

On a periodic basis, a CID best phase compute block 108 may determine an optimal impulse response h'$_{opt}$(n) from among the plurality of impulse responses h$^0$[0:I]-h$^1$[0:I] each associated with a respective phase and stored in cache 474. The CID best phase compute block 108 may attempt to minimize or maximize a particular metric to determine h'$_{opt}$(n). That is, on a periodic basis the CID best phase compute block 108 may apply a metric to the plurality of impulse response signals h$^0$[0:I]-h$^1$[0:I] stored in the cache 474. For example, the CID may include a timer 798. Upon the running of the timer 798, a signal may be sent to the CID best phase compute block 108 to cause the determination of h'$_{opt}$(n) from h$^0$[0:I]-h$^1$[0:I]. Upon determination of h'$_{opt}$(n), the timer may be reset and the process re-initiated. According to one embodiment, the CID best phase compute block 108 utilizes a metric to minimize the ISI energy of the estimated channel impulse response signals relative to a main tap. For example, according to one embodiment the metric to be maximized is (where the first term h(3) is for a main tap and other terms are ISI terms):

$$[h^p(3)]^2-[h^p(2)]^2-[h^p(1)]^2-[h^p(0)]^2-[h^p(4)]^2-[h^p(5)]^2$$

Upon determination of h'$_{opt}$(n) 312, for example, utilizing the minimum ISI energy metric described above, h'$_{opt}$(n) may be provided to a TVPD 196 for utilization in a timing recovery assist operation (i.e., to generate a phase signal p(n)) in conjunction with a timing recovery block 105. However, according to one embodiment, before h'$_{opt}$(n) is provided to the TVPD 196, h$_{opt}$(n) may be processed by an update circuit 729. It may be desirable because of tracking errors not to update the phase of the TVPD 196 too rapidly. The update circuit 729 may function to cause a slow updating of the h'$_{opt}$(n) provided to the TVPD 196, where the updated parameter that is provided is shown herein as h$_{opt}$(n).

The update circuit 729 may include a cache 752, a ramp circuit 754, a threshold circuit 756 and a multiplication block 758. h'$_{opt}$(n) may be provided to a cache 752 which stores a plurality of h'$_{opt}$(n)'s as they are provided by the CID best phase compute block 108. A threshold circuit 756 may at each clocking instant determine difference between the current best phase h'$_{opt}$(n) and the h$_{opt}$(n) stored in the cache 752. In particular, the update circuit may function only when the change in h'$_{opt}$(n) exceeds a certain programmable threshold so as to update the cache. This error may be divided by a large value and the divided value may slowly update the h$_{opt}$(n)'s provide into the TVPD 196.

Figure 8:
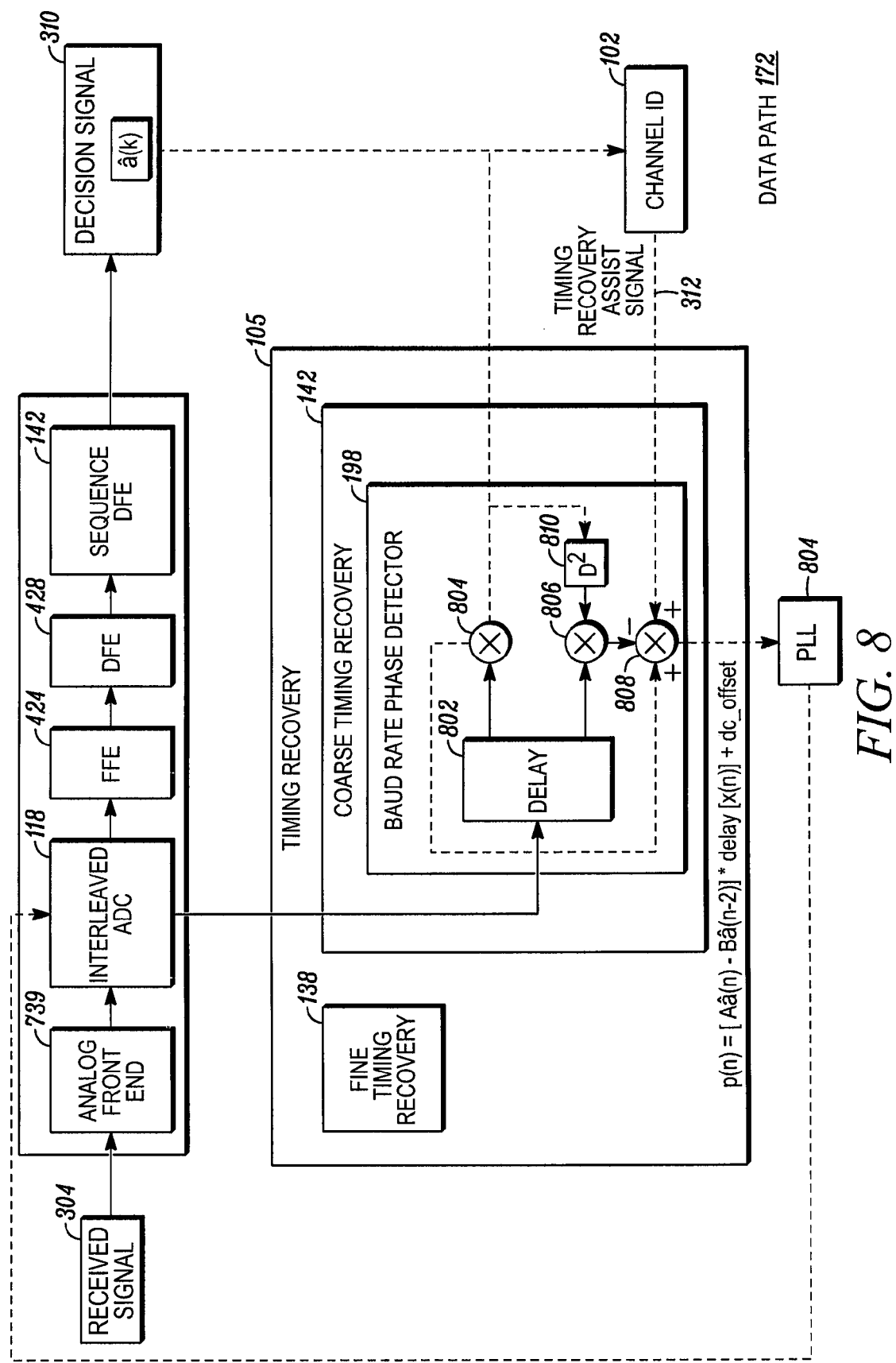
FIG. 8 depicts an operation of a baud rate phase detector.

FIG. 8 depicts an operation of a baud rate phase detector. The signal path shown in FIG. 8 may be operative before an estimated channel impulse response has been determined by the CID 102 (i.e., when the signal processing system 140 is in a startup mode). As shown in FIG. 8, a timing recovery block 105 may include a coarse timing recovery block 142 and a fine timing recovery block 138. The coarse timing recovery block 142 may include a baud rate phase detector 198. The baud rate phase detector may include a delay 802, a first multiplication block 804, a second multiplication block 806, a delay element 810 and a summation block 808.

A received signal 304 may be provided to data path 172 that includes an analog front end 739, an interleaved ADC 118, an interleaved FFE 424, an interleaved DFE 428 and a sequence DFE 142. The received signal 304 may be provided to an analog front end 739, which performs analog signal processing on the received signal. The processed output of the analog front end 739 may then be provided to an interleaved ADC 118, which may perform analog to digital conversion on the processed analog signal. The output of the interleaved ADC 118 may be provided to an interleaved FFE 424. The output of the interleaved FFE 424 may be provided to an interleaved DFE 428. The output of the interleaved DFE 428 may be provided to a sequence DFE 142. The sequence DFE 142 may generate a decision signal â(k) 310. The decision signal â(k) 310 may also be provided to a channel ID block 102, which may generate a timing recovery assist signal 312 herein referred to as the dc_offset signal (that is, the assist signal 312 in start-up mode, which includes at least a dc_offset value).

At least one digital output of the interleaved ADC 118 may be provided to a delay 802 in the baud rate phase detector 198. The decision signal â(k) 310 generated by the sequence DFE 142 may be provided to a first multiplication block 804 and a delay element 810 in the baud rate phase detector 198. The output of the delay 802 may also be provided to the first multiplication element 804, where it is multiplied by the decision signal â(k) 310. Delay element 810 may generate a two sample delayed version of the decision signal â(k) 310, which it may provide to a second multiplication block 806, where the delayed decision signal â(k) 310 may be multiplied by the output of the delay 802. The output of the second multiplication block may then be provided to the summation block 806 where it is combined with the timing recovery assist signal 312 (dc_offset) provided by the channel ID.

The summation block 808 may generate a phase signal p(n) by combining the output of the first multiplication block 804, the second multiplication block 806 utilizing the following relation, where A & B are scalar constants, where this relation may be referred to herein as the dc phase detector relation:

$$p(n)=[Aâ(n)-Bâ(n-2)]*\text{delay}[x(n)]+dc\_\text{offset}$$

Figure 9:
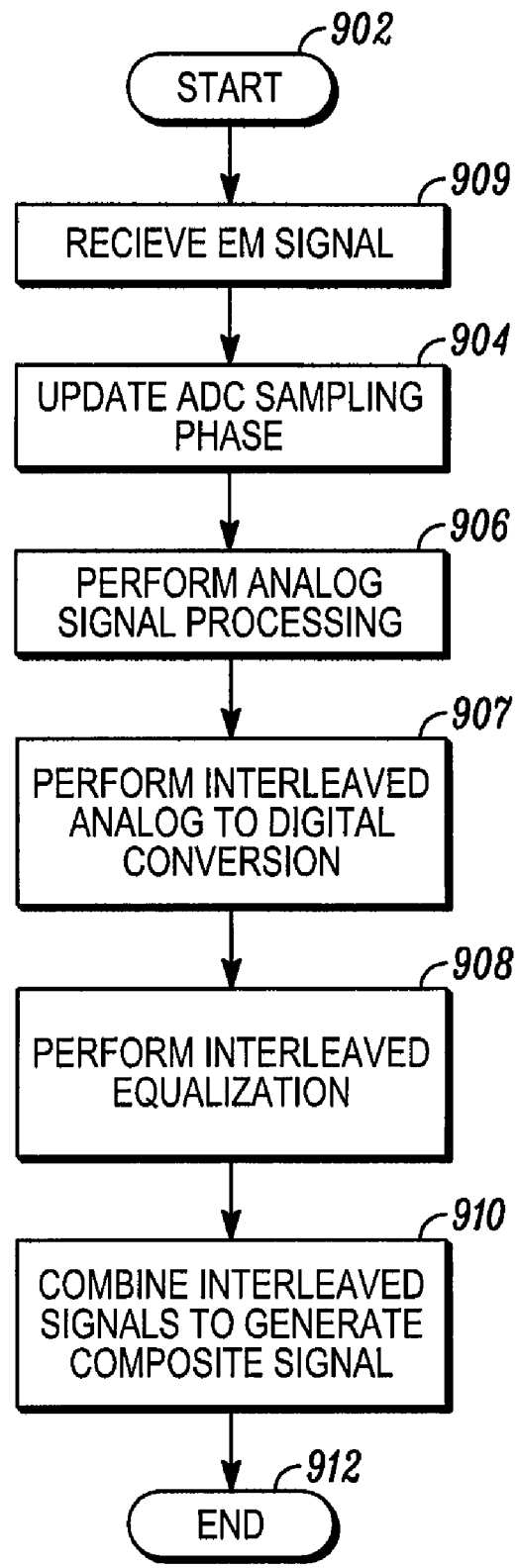
FIG. 9 is a flowchart depicting an operation of a signal processing system according to one embodiment.

FIG. 9 is a flowchart depicting an operation of a signal processing system according to one embodiment. The process is initiated in step 902. In step 909 an electromagnetic signal is received. The electromagnetic signal may be received by a receiver over a communication channel 182. In step 904 a sampling phase of an interleaved ADC may be updated. As described herein, the interleaved ADC may be controlled by a timing recovery operation performed by a baud rate phase detector, a TVPD or a combination thereof. As previously noted, the phase detectors (TVPD or baud rate) may generate a phase signal p(n), which may be provided to a PLL to control a sampling clock of the interleaved ADC. Although FIG. 9 suggests that this step occurs serially, the update of the ADC sampling phase 904 may be occurring in parallel with the other steps depicted in FIG. 9.

In step 906, analog signal processing may be performed on the received signal. According to one embodiment, the analog signal processing may comprise variable gain amplification or other processing. In step 907, analog to digital conversion may be performed on the processed analog signal. According to one embodiment, the analog to digital conversion may be performed in an interleaved fashion using an interleaved ADC. In step 908, digital equalization may be performed on the output of the ADC. According to one embodiment, the equalization may be performed in an interleaved manner using an interleaved equalizer block. According to one embodiment, the interleaved equalizer may include an interleaved FFE, an interleaved DFE and a sequence DFE. In step 910, the interleaved signals provided by the interleaved structures (ADC and equalizers) may be combined to generate a composite signal. The process ends in step 912.

Figure 10:
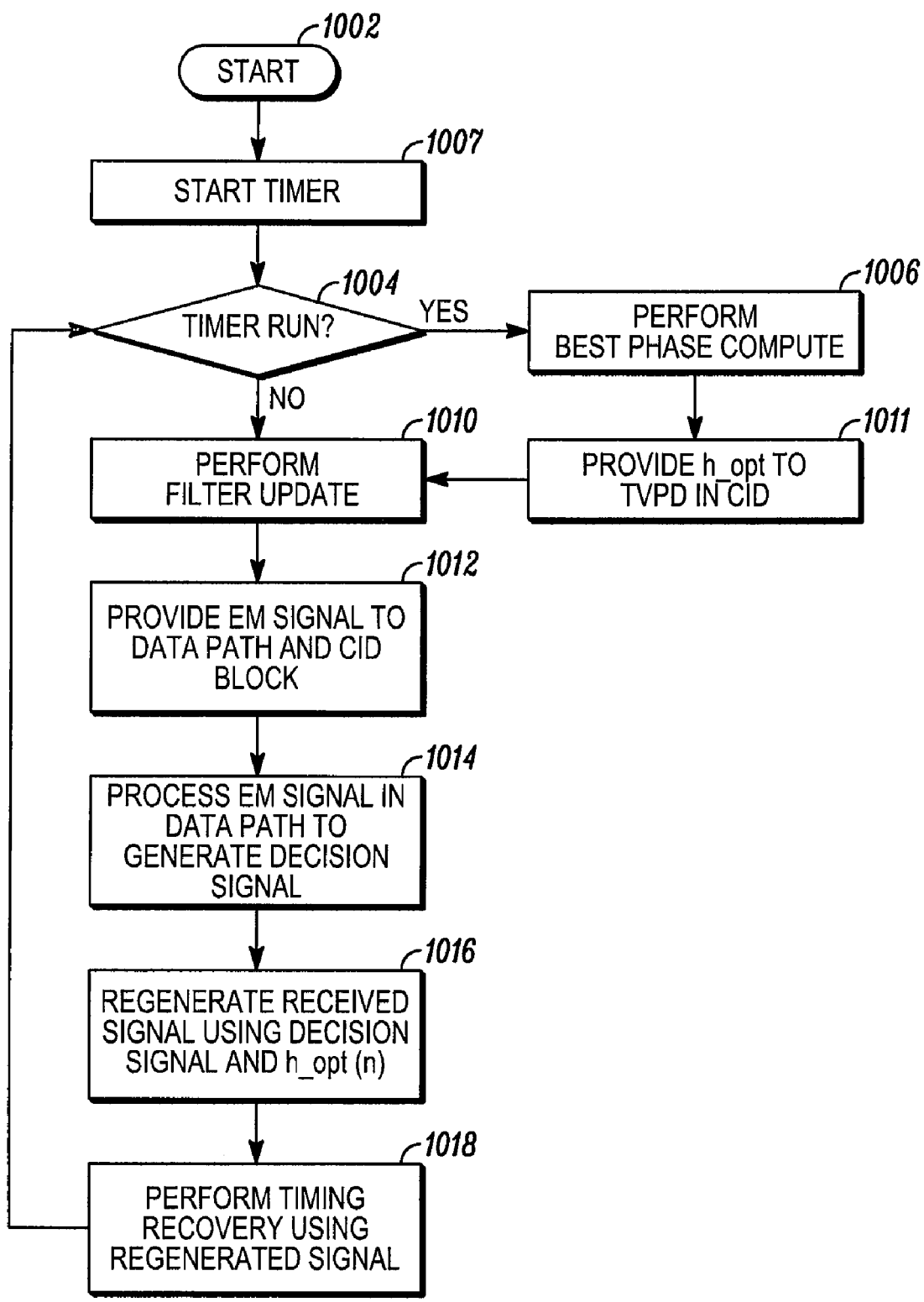
FIG. 10 is a flowchart of an operation performed by a signal processing system according to one embodiment.

FIG. 10 is a flowchart of an operation performed by a signal processing system according to one embodiment. The process shown in FIG. 10 may be executed during a steady state operation of the signal processing system (i.e., after startup operations have been completed). Thus, it is assumed that h_opt(n) has been determined and the system has settled (i.e., the filter routines have converged). The process is initiated in step 1002. In 1007, a timer may be initialized. In 1004, a test is performed to determine whether the timer has run. If not ('no' branch of 1004), in 1010 a filter update is performed. The filter update may be a routine to estimate of an impulse response of a communication channel.

In 1012, a received signal 304 may be provided to both a data path and a CID block of the signal processing system 140. In 1014, the EM signal may be processed by the data path to generate a decision signal 310. In step 1016, a regenerated signal ŷ(n) may be generated using the decision signal 310 to determine the optimal impulse response for the communication channel h_opt(n). According to one embodiment, the regenerated signal may be generated via a TVPD. In 1018, a timing recovery operation may be performed using the regenerated signal ŷ(n). According to one embodiment, the timing recovery operation may utilize a variant of the Mueller-Muller algorithm. Flow then continues with 1004.

If the timer has run ('yes' branch of 1004), in 1006 a best phase compute operation may be performed. The best phase compute operation may determine an optimal estimated impulse response for a communication channel using a pre-defined metric. In 1011, the optimal estimated impulse response may be provided to a TVPD. Flow then continues with 1010.

FIG. 11 is a flowchart of an operation performed by a start-up state machine of one embodiment, such as the start-up state machine 126 of FIG. 1. In general FIG. 11 describes techniques for starting, executing, or otherwise managing a state of the EDC system 140 of FIG. 1. As such, FIG. 11 is intended to provide a description of the start-up state machine 126 of FIG. 1, but does not provide an exhaustive or comprehensive description. For example, conventional functions or techniques of a start-up state machine may be performed by the start-up state machine 126 that are not described here in detail. For example, a number of registers and timers, not shown or described explicitly with respect to FIG. 11, may be maintained that may be used to store and control the various states of the EDC system 140. Further, the start-up state machine 126 may implement some or all of the functionality described above with respect to FIGS. 1-10, or comparable functionality, although not all such functionality is necessarily described or referenced with respect to FIG. 11.

In FIG. 11, and generally, the start-up state machine 126 seeks to find optimal settings for the various blocks, including the ADC(s) 120, the equalizer(s) 132, the coarse and fine PGA 132/134, the CID 102, and the timing recovery 105. As such, the start-up state machine 126 may seek to implement a number of known settings, and to select from such settings the appropriate values for obtaining a desired performance of the EDC system 140. Once the desired performance level(s) is(are) reached, then the start-up state machine 126 may be responsible for monitoring this(these) performance level(s) and for re-calibrating or re-starting when necessary to maintain or regain this(these) performance level(s).

Thus, in FIG. 11, in an initial state the PLL 804 may be converged using a default initial value for the dc_offset value (e.g., a value of 1) from the baud rate phase detector 198 (1102). Then the coarse PGA 130 may be allowed to settle (1104), e.g., to settle to a pre-set value that is within an available gain range. A loss of signal (LOS) module (not pictured) may be started (1106), which may be operable to detect a signal loss or absence (e.g., by monitoring the ADC signal relative to reference thresholds).

Next, the dc_offset may be selected (1108) and implemented for three available phase detectors (1110). For example, with reference to FIG. 8, some initial values for dc_offset may be selected, and the baud rate phase detector 198 may be implemented as a dc phase detector, e.g., as one or more of a pre-cursor phase detector, a post-cursor phase detector, and/or a symmetrical phase detector. That is, assumptions about the channel characteristics may be made, and the channel impulse response may be determined accordingly. Then a channel impulse response may be selected that is relatively close to an actual channel impulse response when the timing recovery converges.

In one example, the baud rate phase detector 198 may assume dc_offset values within some range (e.g., −0.5 to 0.5), and may sweep through these values at pre-determined increments. For each incremental value, some or all of the dc phase detectors may be executed, until timing recovery convergence occurs and/or some performance threshold is reached, and/or until all values are exhausted (whereupon an optimal value may be selected). For example, in the dc phase detector relation defined above, certain assumptions about the channel characteristic (e.g., as having pre-cursor, post-cursor, or symmetric ISI) may allow one or more terms to be known or assumed, and the phase signal may be calculated accordingly.

In the example of FIG. 11, the equalizer(s) 132 also may be initialized, somewhat analogously, by selected tap values from available libraries of values (1112). With these selected values in place, the coarse TR 142, the FFEs 124(1)-124(n), and the DFEs 128(1)-128(M) may be turned on and allowed to settle according to a pre-set timer value, and the coarse PGA may be allowed to (re-)settle, as well (1114). These operations (1112, 1114) may be repeated until acceptable tap values are determined, whereupon the fine TR and fine PGA loops may be turned on and allowed to settle (1116).

In FIG. 11, an outer loop may continue with a next value of the dc_offset (1118), or, if a suitable dc_offset has been determined, then channel ID and timing recovery may commence (1120), e.g., as described above with respect to FIG. 10. If the SNR monitor 498 determines that current SNR values are not acceptable during this operation (1122), then the sequence DFE 142 may be turned on (1124) for additional performance gains. In other implementations, the sequence dfe 142 may be continually turned on. If the performance gains are insufficient to maintain the SNR at acceptable levels, then, re-initialization of the dc phase detector(s), equalizers, and other components may occur (1108-1118). Of course, other metrics besides SNR may additionally or alternatively be monitored in order to determine whether to re-initialize. As long as acceptable SNR levels are maintained, the clock and data recovery (CDR) lock may occur (1126) and CID and timing recovery may continue (1120).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A system for performing dispersion compensation on an electromagnetic signal received over a communication channel, the electromagnetic signal bearing information at a symbol rate comprising:
    an interleaved analog to digital converter ("ADC") block, wherein the interleaved ADC block is configured to generate a plurality of digitally sampled signals from the electromagnetic signal;
    an interleaved equalizer block, wherein the interleaved equalizer block is configured to digitally process each of the digitally sampled signals generated by the ADC block to generate a plurality of digitally equalized signals;
    a multiplexer, wherein the multiplexer is configured to aggregate the digitally equalized signals into a composite output signal;
    a timing recovery block, wherein the timing recovery block is configured to determine a desired sampling phase and provide the desired sampling phase to the ADC block; and
    a plurality of phase interpolators, each phase interpolator being configured to provide, based on the desired sampling phase, a respective clock signal to the interleaved ADC, the interleaved ADC being further configured to use each respective clock signal to generate one or more of the plurality of digitally sampled signals.

2. The system of claim 1, further comprising a channel identification block, wherein the channel identification block is configured to determine a characteristic of the communication channel, and provide the characteristic of the communication channel to the timing recovery block.

3. The system of claim 2, wherein the timing recovery block is further configured to utilize the channel characteristic information to adjust an algorithm for determining the desired sampling phase.

4. The system of claim 2, wherein the channel identification block is further configured to determine a desired sampling phase and provide the desired sampling phase to the timing recovery block.

5. The system of claim 4, wherein the channel characteristic comprises a channel impulse response and the channel identification block is further configured to:
    receive an output from the equalizer block;
    receive a second digitally sampled signal generated from the electromagnetic signal; and
    update at least one coefficient for the channel impulse response based upon the output from the equalizer block and the second digitally sampled signal.

6. The system of claim 5, wherein at least one coefficient of the channel impulse response is updated by correlating output from the equalizer block convolved with the channel impulse response with the second digitally sampled signal.

7. The system of claim 1, wherein the interleaved ADC block is configured to sample the electromagnetic signal at the symbol rate.

8. A method for performing dispersion compensation on an electromagnetic signal received over a communication channel, the electromagnetic signal bearing information at a symbol rate comprising:
    receiving an electromagnetic signal bearing information at a symbol rate;
    updating a desired sampling phase of an interleaved analog digital converter ("ADC"), wherein the desired sampling phase is computed by selecting one of a plurality of estimated channel impulse response signals from a set each having a particular phase;
    performing variable gain amplification on the electromagnetic signal;
    performing interleaved analog to digital conversion on the electromagnetic signal to generate a plurality of interleaved digital signals;
    performing equalization on each of the plurality of interleaved digital signals to generate a plurality of decision signals; and
    combining the plurality of decision signals to generate a composite data signal.

9. The method of claim 8, wherein the analog to digital conversion is performed at the symbol rate.

10. The method of claim 8, wherein the desired sampling phase is computed using an algorithm derived from the Mueller-Muller algorithm.

11. The method of claim 8, wherein the desired sampling phase is computed by determining a channel characteristic.

12. The method of claim 11, wherein the channel characteristic is a channel impulse response.

13. The method of claim 8, wherein the selected channel impulse response signal minimizes a correlation between a digitally sampled version of the electromagnetic signal and the decision signals filtered by the selected channel impulse response.

14. The method of claim 12, wherein the channel impulse response is utilized to select a particular variant of the Mueller-Muller algorithm to perform timing recovery.

15. The method of claim 8, wherein the symbol rate is at least 10 GHz.

16. A method for performing timing recovery for sampling a signal transmitted over a communication channel at an inherent symbol rate comprising:

computing a plurality of estimated channel impulse response signals, each of the plurality of estimated channel impulse response signals having a particular phase;

periodically determining a best estimated channel response signal from the plurality of estimated channel response signals wherein the best estimated channel response signal describes the impulse response of the communication channel that is most suitable for use by the timing recovery algorithm; and adjusting a timing recovery algorithm based upon the best estimated channel response signal.

17. The method of claim 16, wherein the best estimated channel impulse response is determined by minimizing an error signal formed by computing the difference between the signal correlated with a decision signal filtered by each of the estimated channel impulse response signals.

18. The method of claim 17, wherein adjusting the timing recovery algorithm comprises sampling the signal at a phase corresponding to the best estimated channel impulse response.

* * * * *

UNITED STATES PATENT AND TRADEMARK OFFICE
CERTIFICATE OF CORRECTION

PATENT NO. : 7,961,781 B2
APPLICATION NO. : 11/837278
DATED : June 14, 2011
INVENTOR(S) : Vivek Telang et al.

Page 1 of 1

It is certified that error appears in the above-identified patent and that said Letters Patent is hereby corrected as shown below:

On Title page, field (75), in "Inventors", in column 1, line 8, delete "Santa Margarita" and insert -- Rancho Santa Margarita --, therefor.

On Title page, field (74), in column 2, line 1, delete "Bellerman" and insert -- Bellermann --, therefor.

Signed and Sealed this
Sixteenth Day of August, 2011

David J. Kappos
*Director of the United States Patent and Trademark Office*